(12) United States Patent
Jia et al.

(10) Patent No.: US 12,112,489 B2
(45) Date of Patent: *Oct. 8, 2024

(54) METHOD OF ESTABLISHING AN ENHANCED THREE-DIMENSIONAL MODEL OF INTRACRANIAL ANGIOGRAPHY

(71) Applicant: XI'AN CREATION KEJI CO., LTD., Xi'an (CN)

(72) Inventors: Yannan Jia, Xi'an (CN); Wenjie Wang, Xi'an (CN)

(73) Assignee: XI'AN CREATION KEJI CO., LTD., Xi'an (CN)

( * ) Notice: Subject to any disclaimer, the term of this patent is extended or adjusted under 35 U.S.C. 154(b) by 433 days.

This patent is subject to a terminal disclaimer.

(21) Appl. No.: 17/552,282

(22) Filed: Dec. 15, 2021

(65) Prior Publication Data

US 2022/0164967 A1 May 26, 2022

Related U.S. Application Data

(63) Continuation of application No. PCT/CN2021/129608, filed on Nov. 9, 2021.

(30) Foreign Application Priority Data

Nov. 23, 2020 (CN) .......................... 202011324154.8

(51) Int. Cl.
*G06T 17/00* (2006.01)
*G06T 3/4007* (2024.01)
(Continued)

(52) U.S. Cl.
CPC .............. *G06T 7/30* (2017.01); *G06T 3/4007* (2013.01); *G06T 2207/10096* (2013.01);
(Continued)

(58) Field of Classification Search
CPC ................... G06T 7/30; G06T 3/4007; G06T 2207/10096; G06T 2207/20182;
(Continued)

(56) References Cited

U.S. PATENT DOCUMENTS 11,830,193 B2 * 11/2023 Jia .............................. G06T 7/11
2004/0086175 A1 * 5/2004 Parker ................... G06T 11/008
382/128

(Continued)

*Primary Examiner* — Amandeep Saini
*Assistant Examiner* — Mehrazul Islam

(57) ABSTRACT

A method of establishing an enhanced three-dimensional (3D) model of intracranial angiography is provided and includes: obtaining a bright-blood image group, a black-blood image group and an enhanced black-blood image group; preprocessing image pairs to obtain first bright-blood images and black-blood images; registering the first bright-blood image by taking the first black-blood image as reference to obtain a registered bright-blood image group; eliminating flowing void artifact to obtain an artifact-elimination enhanced black-blood image group; subtracting each image of the artifact-elimination enhanced black-blood image group from corresponding black-blood image to obtain angiography enhanced images; establishing a blood 3D model and a vascular 3D model with blood boundary expansion by using the registered bright-blood image group; establishing an angiography enhanced 3D model by using the angiography enhanced images; obtaining an enhanced 3D model of intracranial angiography based on the blood 3D model, the vascular 3D model and the angiography enhanced 3D model.

12 Claims, 9 Drawing Sheets

(51) Int. Cl.
*G06T 5/50* (2006.01)
*G06T 7/30* (2017.01)

(52) U.S. Cl.
CPC ............... *G06T 2207/20182* (2013.01); *G06T 2207/20221* (2013.01); *G06T 2207/30104* (2013.01); *G06T 2211/404* (2013.01)

(58) Field of Classification Search
CPC . G06T 2207/20221; G06T 2207/30104; G06T 2211/404; G06T 2207/20224; G06T 5/50; G06T 2210/41; G06T 17/00
See application file for complete search history.

(56) References Cited

U.S. PATENT DOCUMENTS

2012/0300998 A1* 11/2012 Loudovski ........... A61B 3/0025
 382/128
2015/0339847 A1* 11/2015 Benishti ................ A61B 5/026
 382/131

* cited by examiner

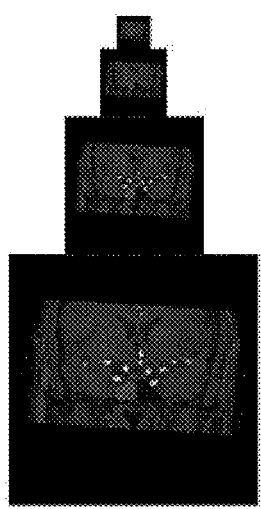 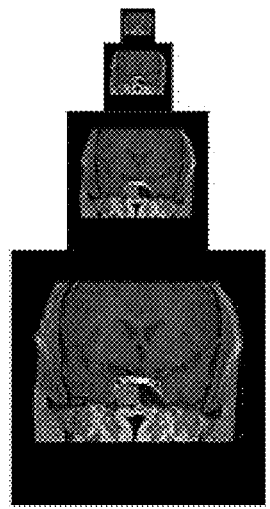 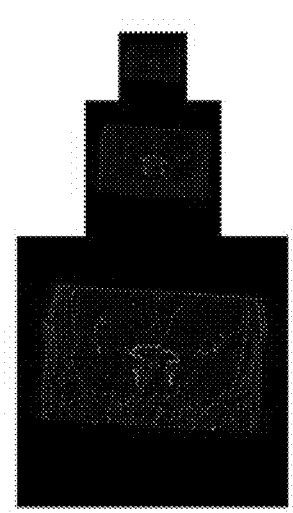 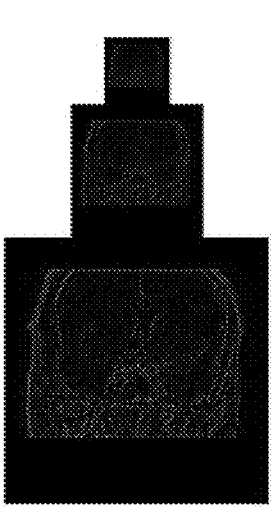
FIG. 6A　　　　FIG.6B　　　　FIG.6C　　　　FIG.6D
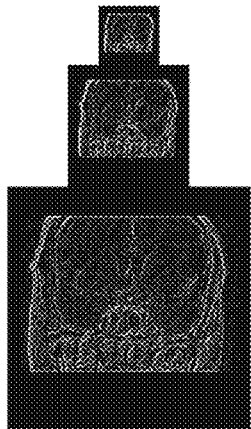 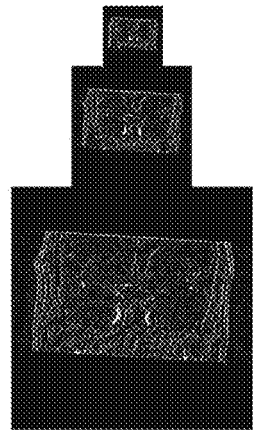 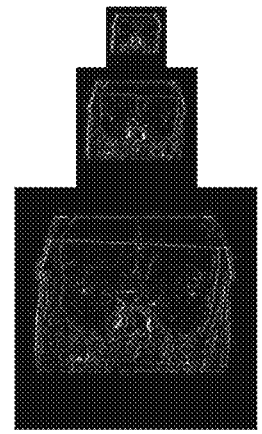
FIG.7A　　　　　FIG.7B　　　　　FIG.7C

METHOD OF ESTABLISHING AN ENHANCED THREE-DIMENSIONAL MODEL OF INTRACRANIAL ANGIOGRAPHY

TECHNICAL FIELD

The disclosure relates to the field of image processing technologies, and more particularly to a method of establishing an enhanced three-dimensional (3D) model of intracranial angiography.

DESCRIPTION OF RELATED ART

With rapid development of China's national economy, people pay more and more attention to health problems. A thesis published by Lancet in June 2019 analyzed causes of death of residents in 34 provinces in China (including Hong Kong, Macao and Taiwan) from 1990 to 2017. It was found that stroke ranked first among the causes of death in China. Stroke is a series of symptoms caused by brain tissue necrosis caused by intracranial vascular rupture, stenosis or blockage, including cerebral hemorrhage and cerebral infarction. If treatments are not timely, the patient may die; even if the treatments are timely, it may cause disability to the patient.

At present, methods based on vascular cavity imaging are usually used to evaluate degrees of intracranial vascular lesions and vascular stenosis, such as a digital subtraction angiography (DSA), a computed tomography angiography (CTA), a magnetic resonance angiography (MRA) and a high-resolution magnetic resonance angiography (HRMRA). Intracranial artery is connected with the carotid artery and the vertebral artery, forming a ring structure at the bottom of the brain, with special structural shape, zigzag shape and extremely thin wall thickness. The path of intracranial artery can be clearly depicted by the magnetic resonance angiography.

Among them, the magnetic resonance angiography technology (for example MRA or HRMRA), as a noninvasive imaging method for patients, can clearly detect and analyze the vascular wall structure of the intracranial blood vessels. A scanned magnetic resonance image has a high resolution for a soft tissue, no bone artifacts, good image quality, and can use a variety of sequences scanning to obtain tissue structures with different imaging characteristics, it has obvious advantages in the display of the intracranial blood vessels.

Because of the images corresponding to bright-blood sequences and black-blood sequences obtained by the magnetic resonance angiography are two-dimensional (2D) images, in clinical practice, doctors need to combine the information of the two kinds of images with experience to obtain the comprehensive situation of the intracranial blood vessels for analyzing intracranial vascular diseases. However, the two-dimensional images have limitations, which is not conducive to obtain the real information of intracranial blood vessels simply and quickly.

SUMMARY

In order to obtain the real information of the intracranial blood vessels simply and quickly in the clinical application, so as to analyze intracranial vascular diseases. Embodiment of the disclosure provides a method of establishing an enhanced three-dimensional (3D) model of intracranial angiography. The method includes:

obtaining a bright-blood image group, a black-blood image group and an enhanced black-blood image group of an intracranial vascular site; wherein the bright-blood image group, the black-blood image group and the enhanced black-blood image group respectively include K number of bright-blood images, K number of black-blood images and K number of enhanced black-blood images, the K number of bright-blood images of the bright-blood image group, the K number of black-blood images of the black-blood image group and the K number of enhanced black-blood images of the enhanced black-blood image group are corresponded one by one, and K is a natural number greater than 2;

taking each of the K number of bright-blood images and one of the K number of enhanced black-blood images corresponding thereto as an image pair to obtain K number of image pairs, and preprocessing each of the K number of image pairs to obtain a first bright-blood image and a first black-blood image of the each of the K number of image pairs, thereby obtaining K number of preprocessed image pairs;

performing an image registration to the first bright-blood image of the each of the K number of image pairs by taking the corresponding first black-blood image as a reference through a registration method of mutual information and image pyramid based on Gaussian distribution sampling, to obtain a registered bright-blood image group comprising K number of registered bright-blood images;

performing an elimination operation of flowing void artifact to the K number of enhanced black-blood images of the enhanced black-blood image group by using the registered bright-blood image group, to obtain an artifact-elimination enhanced black-blood image group comprising K number of target enhanced black-blood images;

performing a subtraction operation between each of the K number of target enhanced black-blood images of the artifact-elimination enhanced black-blood image group and a corresponding one of the K number of black-blood images of the black-blood image group, to obtain K number of angiography enhanced images;

establishing a blood 3D model by using the registered bright-blood image group;

establishing a vascular 3D model with blood boundary expansion by using the registered bright-blood image group;

establishing an angiography enhanced 3D model by using the K number of angiography enhanced images; and obtaining an enhanced 3D model of intracranial angiography based on the blood 3D model, the vascular 3D model and the angiography enhanced 3D model.

In a further embodiment, the preprocessing each of the K number of image pairs to obtain a first bright-blood image and a first black-blood image of the each of the K number of image pairs, includes:

for the image pair, taking the enhanced black-blood image as a reference, performing a coordinate transformation and an image interpolation to the bright-blood image, using a similarity measure based on mutual information and adopting a predetermined search strategy to thereby obtain the first bright-blood image; and extracting content of an area same as a scanning range of the first bright-blood image from the enhanced black-blood image to thereby form the first black-blood image.

In a further embodiment, the performing an image registration to the first bright-blood image of the each of the K number of image pairs by taking the corresponding first black-blood image as a reference through a registration method based on mutual information and image pyramid of Gaussian distribution sampling, to obtain a registered bright-blood image group comprising K number of registered bright-blood images, includes:

selecting ones of the K number of preprocessed image pairs as test image pairs by Gaussian distribution sampling;

performing the image registration to the first bright-blood image and the first black-blood image of each of the test image pairs through the image registration method of mutual information and image pyramid to obtain a rotation matrix corresponding to the first bright-blood image of each of the test image pairs after the image registration, thereby obtaining rotation matrices of the first bright-blood images of the test image pairs after the image registration;

obtaining a mean value of rotation matrix according to the rotation matrices; and performing a coordinate transformation to the first bright-blood images of the other preprocessed image pairs except the test image pairs by using the mean value of rotation matrix to complete the image registration, thereby obtaining the registered bright-blood image group comprising the K number of registered bright-blood images.

In a further embodiment, the performing the image registration to the first bright-blood image and the first black-blood image of each of the test image pairs through the image registration method based on mutual information and image pyramid to obtain a rotation matrix corresponding to the first bright-blood image of each of the test image pairs after the image registration, includes:

for each of the test image pairs, based on down-sampling processing, obtaining a bright-blood Gaussian pyramid according to the first bright-blood image and a black-blood Gaussian pyramid according to the first black-blood image; wherein each of the bright-blood Gaussian pyramid and the black-blood Gaussian pyramid includes m number of images with resolutions decreased gradually from bottom to top, and m is a natural number greater than 3;

based on up-sampling processing, obtaining a bright-blood Laplacian pyramid according to the bright-blood Gaussian pyramid and a black-blood Laplacian pyramid according to the black-blood Gaussian pyramid; wherein each of the bright-blood Laplacian pyramid and the black-blood Laplacian pyramid includes (m−1) number of images with resolutions decreased gradually from bottom to top;

registering the image in each layer of the bright-blood Laplacian pyramid with the image in a corresponding layer of the black-blood Laplacian pyramid to obtain a registered bright-blood Laplacian pyramid; and registering the images in respective layers of the bright-blood Gaussian pyramid with the images in corresponding layers of the black-blood Gaussian pyramid respectively from top to bottom by using the registered bright-blood Laplacian pyramid as superposition information to obtain a registered bright-blood Gaussian pyramid, and obtain the rotation matrix corresponding to the first bright-blood image of the test image pair after the image registration.

In a further embodiment, the registering images in respective layers of the bright-blood Gaussian pyramid with the images in corresponding layers of the black-blood Gaussian pyramid respectively from top to bottom by using the registered bright-blood Laplacian pyramid as superposition information to obtain a registered bright-blood Gaussian pyramid, includes:

for an j-th layer from top to down of each of the bright-blood Gaussian pyramid and the black-blood Gaussian pyramid, using a black-blood Gaussian image corresponding to the j-th layer of the black-blood Gaussian pyramid as a reference image and a bright-blood Gaussian image corresponding to the j-th layer of the bright-blood Gaussian pyramid as a floating image, using a similarity measure based on mutual information and adopting a predetermined search strategy to realize the registering of images, thereby obtaining a registered bright-blood Gaussian image of the j-th layer;

performing an up-sampling operation to the registered bright-blood Gaussian image of the j-th layer, adding the registered bright-blood Gaussian image of the j-th layer after the up-sampling operation with a registered bright-blood Laplacian image of a corresponding layer of the registered bright-blood Laplacian pyramid to obtain an added image, and replacing a bright-blood Gaussian image of a (j+1)th layer of the bright-blood Gaussian pyramid by the added image; and taking a black-blood Gaussian image of the (j+1)th layer of the black-blood Gaussian pyramid as a reference image and the bright-blood Gaussian image of the (j+1)th layer after the replacing as a floating image, using a predetermined similarity measure and a predetermined search strategy to realize the registering and thereby obtain a registered bright-blood Gaussian image of the (j+1)th layer;

wherein j=1, 2, . . . , m−1; each the black-blood Gaussian image is one of the m number of images of the black-blood Gaussian pyramid, and each the bright-blood Gaussian image is one of the m number of images of the bright-blood Gaussian pyramid.

In a further embodiment, the performing an elimination operation of flowing void artifact to the K number of enhanced black-blood images of the enhanced black-blood image group by using the registered bright-blood image group, to obtain an artifact-elimination enhanced black-blood image group comprising K number of target enhanced black-blood images, includes:

improving contrast of each of the K number of registered bright-blood images to obtain a contrast-enhanced bright-blood image, thereby obtaining K number of contrast-enhanced bright-blood images;

extracting blood information from each of the K number of contrast-enhanced bright-blood images to obtain K number of bright-blood feature images;

fusing each of the K number of bright-blood feature images with the enhanced black-blood image corresponding to the registered bright-blood image according to a preset image fusion formula to obtain the target enhanced black-blood image of elimination of flowing void artifact corresponding to the enhanced black-blood image;

obtaining the artifact-elimination enhanced black-blood image group according to the target enhanced black-blood images respectively corresponding to the K number of enhanced black-blood images.

In a further embodiment, the extracting blood information from each of the K number of contrast-enhanced bright-blood images to obtain K number of bright-blood feature images, includes:
  determining a first threshold by using a preset image binarization method;
  extracting the blood information from each of the K number of contrast-enhanced bright-blood images by using the first threshold; and
  obtaining the bright-blood feature image according to the extracted blood information.

In a further embodiment, the establishing a blood 3D model by using the registered bright-blood image group, includes:
  acquiring a first 3D volume data composed of the K number of contrast-enhanced bright-blood images;
  calculating a second threshold corresponding to a second 3D volume data located at a middle of the first 3D volume data by using a maximum interclass variance method; and
  using the second threshold as an input threshold of a method of marching cubes, and processing the first 3D volume data by the method of marching cubes to obtain the blood 3D model.

In a further embodiment, the establishing a vascular 3D model with blood boundary expansion by using the registered bright-blood image group, includes:
  acquiring the K number of bright-blood feature images;
  expanding a blood boundary of each of the K number of bright-blood feature images according to an expansion operation, to obtain K number of expanded bright-blood feature images corresponding to the K number of bright-blood feature images respectively;
  calculating a difference between each of the K number of expanded bright-blood feature images and the corresponding bright-blood feature image, to obtain K number of difference feature images corresponding to the K number of bright-blood feature images respectively;
  determining a third threshold; and
  taking the third threshold as an input threshold of the method of marching cubes, and processing the K number of difference feature images by the method of marching cubes, to obtain the vascular 3D model with blood boundary expansion.

In a further embodiment, the obtaining an enhanced 3D model of intracranial angiography based on the blood 3D model, the vascular 3D model and the angiography enhanced 3D model, includes:
  retaining an area of the angiography enhanced 3D model overlapped with the vascular 3D model, to obtain a retained angiography enhanced 3D model; and
  fusing the retained angiography enhanced 3D model with the blood 3D model, to obtain the enhanced 3D model of intracranial angiography.

In a further embodiment, the extracting content of an area same as a scanning range of the first bright-blood image from the enhanced black-blood image to thereby form the first black-blood image, includes:
  obtaining vascular edge contour information in the first bright-blood image;
  extracting minimum and maximum of abscissa and minimum and maximum of ordinate in the edge contour information to obtain four coordinate values, and determining an initial extraction box based on the four coordinate values;
  expanding the initial extraction box by a preset number of pixels in each of four directions within a size range of the first bright-blood image, to obtain a final extraction box; and
  extracting content of an area corresponding to the final extraction box in the enhanced black-blood image, to form the first black-blood image.

In a further embodiment, the obtaining a bright-blood Laplacian pyramid according to the bright-blood Gaussian pyramid and a black-blood Laplacian pyramid according to the black-blood Gaussian pyramid uses the following mathematical formula:
  $L_i = G_i - \text{UP}(G_{i+1}) \otimes \zeta_{5\times 5}$, where $L_i$ represents an i-th layer of one of the bright-blood Laplacian pyramid and the black-blood Laplacian pyramid, $G_i$ represents an i-th layer of a corresponding one of the bright-blood Gaussian pyramid and the black-blood Gaussian pyramid, UP represents up-sampling for image enlarging, $\otimes$ is a convolution operator, $\zeta_{5\times 5}$ is a Gaussian kernel used in building the one of the bright-blood Laplacian pyramid and the black-blood Laplacian pyramid, and i is a positive integer less than or equal to $(m-1)$.

In schemes provided by the embodiments of the disclosure, firstly, performing the image registration to the bright-blood images and the enhanced black-blood images scanned by the magnetic resonance angiography technology by using the registration method of mutual information and image pyramid based on Gaussian distribution sampling, which can improve the registration efficiency and improve the registration accuracy layer by layer from low-resolution to high-resolution, and the bright-blood images and the enhanced black-blood images can be unified in the same coordinate system through the above image registration. Secondly, performing the elimination operation of flowing void artifact to the enhanced black-blood image by using the registered bright-blood image, which can display more accurate and comprehensive vascular information. The schemes provided by the embodiments of the disclosure is to eliminate the flowing void artifact from the perspective of image post-processing without using new imaging technology, imaging mode or pulse sequence, therefore, the flowing void artifact can be eliminated simply, accurately and quickly, and can be well popularized in the clinical application. Thirdly, establishing the blood 3D model and the vascular 3D model with blood boundary expansion by using the registered bright-blood images, and calculating the difference between each of the artifact-elimination enhanced black-blood images and the corresponding black-blood image to obtain the angiography enhanced 3D with angiography enhancement effect, and finally, obtaining the enhanced 3D model of intracranial angiography corresponding to the vascular wall with the angiography enhancement effect based on the blood 3D model, the vascular 3D model and the angiography enhanced 3D model. The enhanced 3D model of intracranial angiography realizes the 3D visualization of the intracranial blood vessels. It does not need doctors to restore the tissue structure and disease characteristics of the intracranial blood vessels through imagination. It is convenient for doctors to observe and analyze the morphological characteristics of the blood vessels from any interested angle and level, and can provide realistic 3D spatial information of the blood vessels, convenient to visually display the vascular wall with obvious angiography enhancement, and convenient to locate and display the lesion area. In the clinical application, it can easily and quickly obtain the real information of intracranial blood vessels for analyzing vascular disease.

7

Of course, the implementation of any of the disclosure products or methods does not necessarily need to achieve all the advantages described above at the same time.

BRIEF DESCRIPTION OF THE DRAWINGS

FIG. 6A through FIG. 6B are schematic diagrams of the bright-blood Gaussian pyramid and the black-blood Gaussian pyramid of intracranial vascular magnetic resonance images respectively according to the embodiment of the disclosure.

FIG. 6C through FIG. 6D are schematic diagrams of the bright-blood Laplacian pyramid and the black-blood Laplacian pyramid of intracranial vascular magnetic resonance images respectively according to the embodiment of the disclosure.

FIG. 7A through FIG. 7C show registration results of Laplacian pyramid images of intracranial vascular magnetic resonance images according to the embodiment of the disclosure.

8

Figure 17:
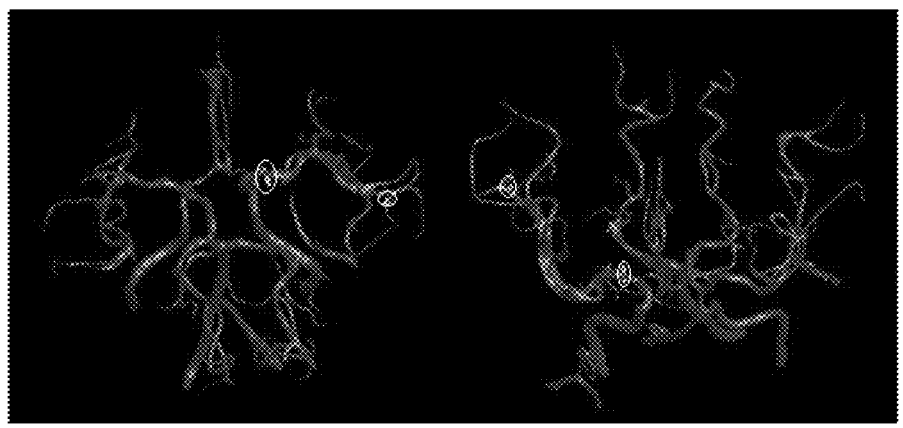

FIG. 17 shows effect of an enhanced 3D model of intracranial angiography.

DETAILED DESCRIPTION OF EMBODIMENTS

In order to obtain the real information of the intracranial blood vessels simply and quickly in the clinical application, so as to analyze intracranial vascular diseases. Embodiment of the disclosure provides a method of establishing an enhanced three-dimensional (3D) model of intracranial angiography.

It should be noted that, an executive body of the method of establishing the enhanced 3D model of intracranial angiography provided by the embodiment of the disclosure can be an establishing apparatus of the enhanced 3D model of intracranial angiography, which can run in an electronic device. The electronic device can be a vascular imaging device or an image processing device, which is not limited to this.

Figure 1:
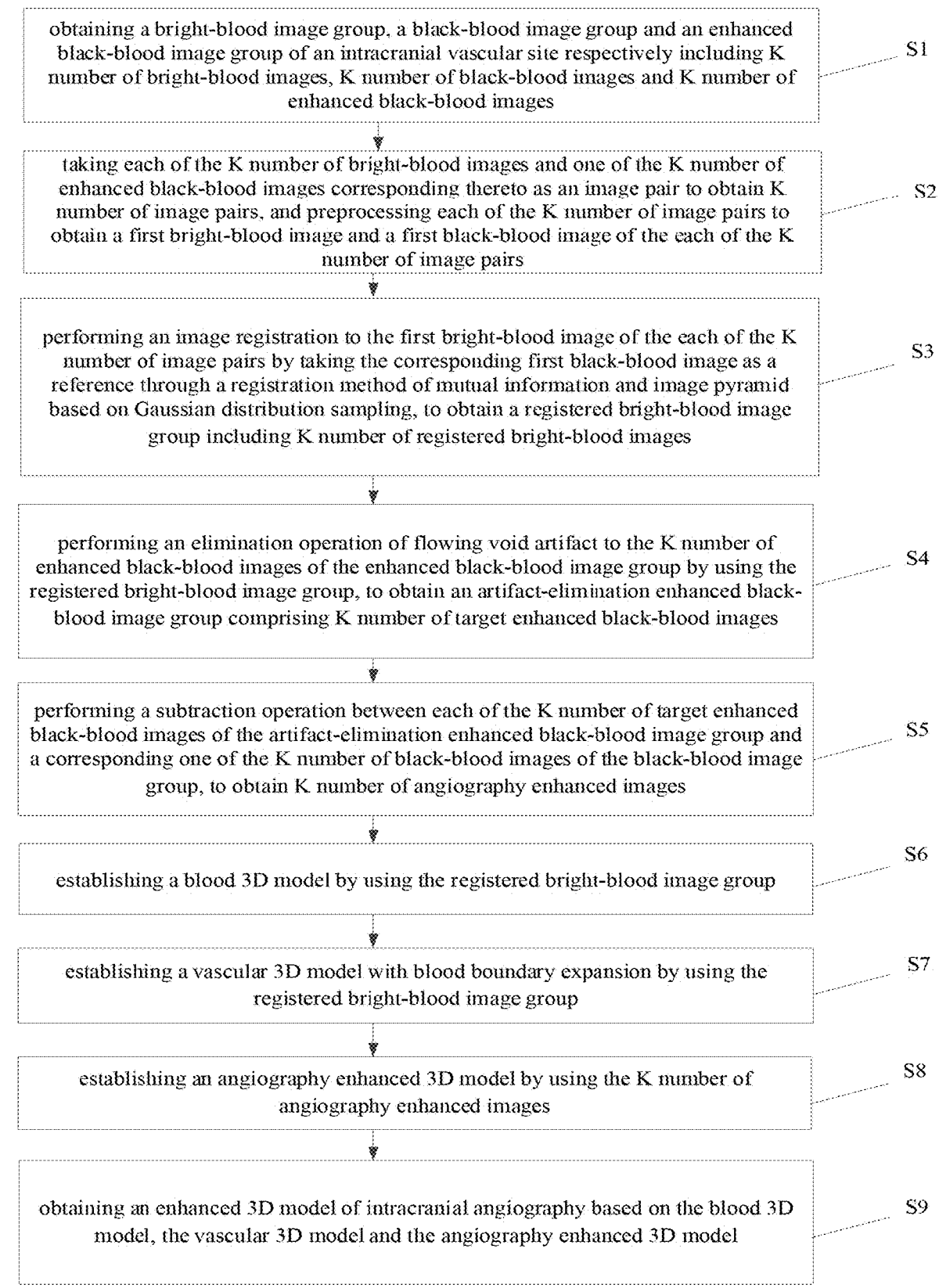
FIG. 1 is a flowchart of a method of establishing an enhanced 3D model of intracranial angiography according to an embodiment of the disclosure.

As shown in FIG. 1, an embodiment of disclosure provides a method of establishing an enhanced three-dimensional (3D) model of intracranial angiography, including step 1 (also referred as S1)~step 9 (also referred as S9):

S1, obtaining a bright-blood image group, a black-blood image group and an enhanced black-blood image group of an intracranial vascular site;

specifically, the bright-blood image group, the black-blood image group and the enhanced black-blood image group respectively include K number of bright-blood images, K number of black-blood images and K number of enhanced black-blood images, the K number of bright-blood images of the bright-blood image group, the K number of black-blood images of the black-blood image group and the K number of enhanced black-blood images of the enhanced black-blood image group are corresponded one by one, and K is a natural number and greater than 2.

The bright-blood image group is an image group obtained by performing bright-blood sequence scanning to the intracranial vascular site by using the magnetic resonance angiography technology. The black-blood image group is an image group obtained by performing black-blood sequence scanning to the intracranial vascular site by using the magnetic resonance angiography technology. The enhanced black-blood image group is an image group obtained by injecting a paramagnetic contrast agent into the patients, and then performing the black-blood sequence scanning to the intracranial vascular site by the magnetic resonance angiography technology. In the embodiment of the disclosure, the magnetic resonance angiography technology is preferably HRMRA.

The K number of bright-blood images of the bright-blood image group, the K number of black-blood images of the black-blood image group and the K number of enhanced black-blood images of the enhanced black-blood image group are corresponded one by one, the corresponding mode is that the order of images formed according to the scanning time is the same.

S2, taking each of the K number of bright-blood images and one of the K number of enhanced black-blood images corresponding thereto as an image pair to obtain K number of image pairs, and preprocessing each of the K number of image pairs to obtain a first bright-blood image and a first black-blood image of the each of the K number of image pairs, thereby obtaining K number of preprocessed image pairs;

The S2 can be understood as an image preprocessing process. In an optional embodiment, each image pair is preprocessed to obtain the first bright-blood image and the first black-blood image of the image pair, which can include step 21 (also referred as S21) and step 22 (also referred as S22):

S21, for the image pair, taking the enhanced black-blood image as a reference, performing a coordinate transformation and an image interpolation to the bright-blood image, using a similarity measure based on mutual information and adopting a predetermined search strategy to thereby obtain the first bright-blood image;

The enhanced black-blood image is scanned and imaged according to the coronal plane, while the bright-blood image is scanned and imaged according to the axial plane. Different directions of the sequence scanning will lead to different final magnetic resonance imaging (MRI) levels. Therefore, it is necessary to observe magnetic resonance images of different MRI levels in a standard reference coordinate system through the coordinate transformation.

For the vascular image, the coordinate transformation of the image can be realized by using the direction information in the digital imaging and communications in medicine (DICOM) file of the medical image. DICOM file is the image storage format of medical devices such as CT or NMR (nuclear magnetic resonance). The DICOM3.0 format image file contains orientation label information related to the imaging direction. The orientation label information briefly introduces the orientation relationship between the patient and the imaging instrument. Through the data of the orientation label information, we can know the accurate position information of each pixel in the image. Specifically, the enhanced black-blood image and the bright-blood image are the images to be registered, according to the orientation label information of the DICOM file of the bright-blood image, the enhanced black-blood image can be used as the reference image, the bright-blood image can be used as the floating image, and the bright-blood image can be performed coordinate transformation according to the coordinate system of the enhanced black-blood image, the purpose of rotating the bright-blood image to the same coordinate system as the enhanced black-blood image is realized. After the rotation, the scanning direction of the bright-blood image also becomes the coronal plane.

In order to facilitate the understanding of the method of the embodiment of the disclosure, the following is briefly introduced in combination with the image registration process, and the specific process can be understood by referring to relevant existing technologies.

For the registration of two images A and B, in fact, each coordinate position in image A is mapped to the image B through a mapping relationship. The specific coordinate transformation methods can include a rigid body transformation, an affine transformation, a projection transformation and a nonlinear transformation. Since the intracranial blood vessels can be regarded as the rigid body, the embodiment of the disclosure selects the rigid body transformation as the coordinate transformation method.

However, in the process of the coordinate transformation, the coordinate system of the floating image will stretch or deform, and the pixel coordinates of the image after the coordinate transformation will not completely coincide with the sampling grid of the original image, that is, the pixel coordinate points of the original integer may no longer be integers after the coordinate transformation, resulting in the loss of some pixels in some areas of the image, therefore, in the process of the coordinate transformation of the image, it is necessary to perform resampling and interpolation to the image at the same time to determine the gray value of pixel coordinate points of the image after the coordinate transformation, which is convenient for subsequent processing. Specifically, the coordinates of the bright-blood image after the coordinate transformation may be mapped to the non-integer coordinates of the original image, so it is necessary to interpolate the bright-blood image at the same time. Image interpolation methods include a nearest neighbor interpolation, a bilinear interpolation and a bicubic interpolation. In the embodiment of the disclosure, the three interpolation methods are tested, and a total of five evaluation indexes are set, namely a root mean square error (RMSE), a peak signal-to-noise ratio (PSNR), a normalized cross-correlation coefficient (NCC), a normalized mutual information (NMI) and a time-consuming (time). The smaller RMSE, the more accurate registration, and the higher values of PSNR, NCC and NMI, the more accurate registration. From the overall experimental data, the accuracy of the bicubic interpolation is obviously better than the nearest neighbor interpolation and the bilinear interpolation. Therefore, the bicubic interpolation is selected.

After using the image interpolation method to restore the missing pixel points, it is also necessary to use some similarity measure to calculate the similarity between the reference image and the changed floating image, then use the search strategy to find the optimal similarity measure, and iterate repeatedly for optimization until the similarity measure of the two images reaches the optimal, and the iteration stops, finally, the coordinate of the floating image is transformed according to the determined spatial transformation matrix (also referred as rotation matrix) to achieve complete image registration. After an iterative algorithm optimization, the image to be registered can calculate to obtain the spatial position registration relationship of the two images and the registered image, so as to maximize the similarity between the registered floating image and the reference image.

The scale to measure the feature similarity between two images is the similarity measure. Selecting an appropriate similarity measure can improve the registration accuracy and effectively suppress noise, it plays a very important role in the image registration. The commonly used similarity measures are mainly divided into three categories: a distance measure, a correlation measure and an information entropy. In the embodiment of the disclosure, the intracranial blood vessels can be regarded as the rigid body with little deformation, which is different from that organ such as heart or lung will change with the movement of human breathing. Therefore, for the intracranial blood vessels, the mutual information or the normalized mutual information can be selected as the similarity measure to make the registration effect more accurate.

Each of the mutual information (MI) and the normalized mutual information (NMI) is one kind of the information entropy. The mutual information, which measures the correlation between two images or the amount of information contained in each other, is used to explain whether the two images have reached the optimal registration. The greater the value of the mutual information, the more similar the two images are. Alternatively, the embodiment can choose the normalized mutual information, which is an improvement of the mutual information measurement. When the gray levels of pixels of the two images to be registered are similar, the NMI is used as the similarity measure to obtain the registered image with higher accuracy and more reliability. The value of the NMI is in a range from 0 to 1. The closer the value is to 1, the more similar the two images are. The concept of the normalized mutual information solves the problem of low accuracy and poor registration effect of the image registration based on mutual information when the overlapping area of two images is small or most of the overlapping area is background information, and reduces the sensitivity of mutual information to image overlapping area.

The image registration is essentially a multi parameter optimization problem, that is, by using the search strategy to change the spatial coordinates of the image, the similarity measurement of the two images is optimized, in which the search strategy and the spatial coordinate change are cross each other in the actual calculation process. The idea of the algorithm is to calculate the similarity measure between the two images in each iteration, adjust the floating image through the operation of the coordinate transformation such as translation or rotation, and interpolate the image until the similarity measure of the two images is the largest. At present, the commonly used search strategies include a gradient descent optimizer, an (1+1)-ES of evolution strategy (ES), etc. the predetermined search strategy in the embodiment of the disclosure can be selected as needed.

Figure 2:
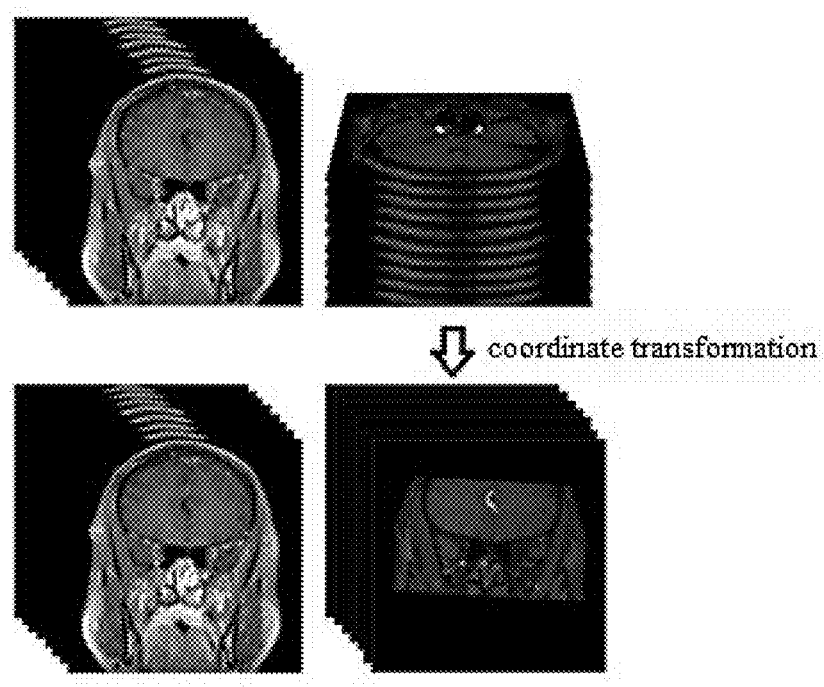
FIG. 2 shows coordinate transformation of intracranial vascular magnetic resonance images according to an embodiment of the disclosure.

The specific experimental results are as follows, refer to FIG. 2, FIG. 2 shows the coordinate transformation of intracranial vascular magnetic resonance images according to the embodiment of the disclosure, in which the first line is the enhanced black-blood image and the bright-blood image respectively, and the second line is the enhanced black-blood image and the bright-blood image after the coordinate transformation respectively. It can be seen that after the coordinate transformation, the scanning direction of the bright-blood image is consistent with that of enhanced black-blood image, both of which are the coronal plane.

Figure 3:
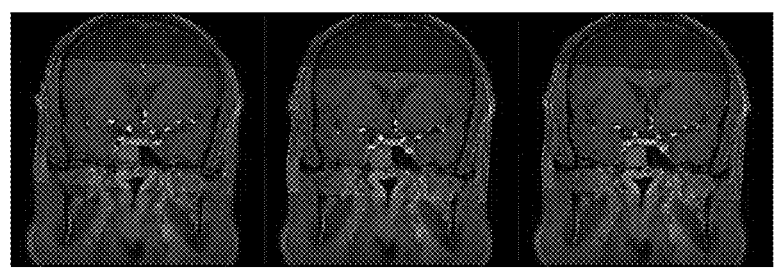
FIG. 3 shows registration comparison results of two kinds of search strategies according to an embodiment of the disclosure.

The two search strategies of the gradient descent optimizer and (1+1)-ES are used to register 160 number of bright-blood images with 160 number of enhanced black-blood images on the corresponding scanning level, in which the enhanced black-blood image is the reference image and the bright-blood image is the floating image. The registration results are shown in FIG. 3, which shows the registration comparison results of the two kinds of search strategies according to an embodiment of the disclosure. The left image of FIG. 3 shows the display results of the two registered image pairs without the optimizer, the middle image shows the display results of the registered image pairs with the gradient descent optimizer, and the right image shows the display results of the registered image pairs with the (1+1)-ES optimizer. The right image shows the montage effect, and the pseudo color transparent processing is used to the enhanced black-blood image and the bright-blood image, the purple is the enhanced black-blood image, and green is the bright-blood image (FIG. 3 is the gray processed image of the original image, and the color is not shown). As can be seen from the FIG. 3, among the image that is not registered with the optimizer, the enhanced black-blood image does not coincide with the bright-blood image, and there are many shadows; when the gradient descent optimizer is used to register the image, although the registration effect is better than that in the left image, there is still an obvious non coincidence in the brain gray matter; In the image using the (1+1)-ES optimizer, the registration result is accurate, and the non-coincident shadow parts in the image disappear completely. The data shown in Table 1 are three evaluation indexes of registration results, namely the normalized mutual information (NMI), the normalized cross-correlation coefficient (NCC) and the algorithm time-consuming (Time). From the experimental results, the registration effect of the image of the (1+1)-ES is clearer and better than that of the gradient descent optimizer. From the experimental data, the three evaluation indexes all show the good performance of the (1+1)-ES optimizer. Therefore, in the embodiment of the disclosure, the predetermined search strategy is the (1+1)-ES.

TABLE 1 analysis of results under different search strategies

| search strategy | NMI$^a$ | NCC$^a$ | Time$^a$/s |
|---|---|---|---|
| gradient descent optimizer | 0.14 ± 0.02 | 2179.81 ± 597.31 | 1.11 ± 0.44 |
| (1 + 1)-ES | 0.17 ± 0.01 | 2147.34 ± 586.85 | 0.70 ± 0.07 |

Where the value of $^a$ in the Table 1 is the mean value±mean square error of the evaluation indexes based on the registration of the 160 bright-blood images and 160 enhanced black-blood images.

Figure 4:
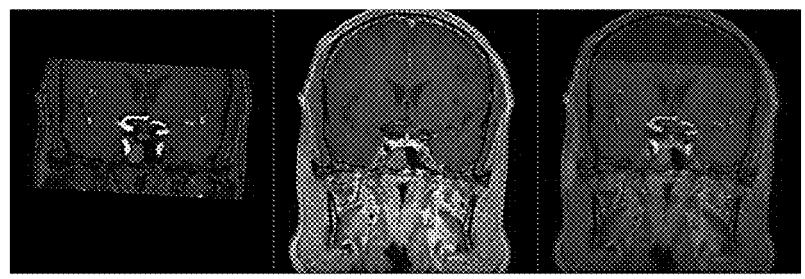
FIG. 4 shows a result of intracranial vascular magnetic resonance images after pre-registration according to the embodiment of the disclosure.

Refer to FIG. 4, which shows a result of intracranial vascular magnetic resonance images after pre-registration according to the embodiment of the disclosure. The left image of FIG. 4 shows the first bright-blood image after the pre-registration, in which the interpolation method adopts the bicubic interpolation; the middle image shows the enhanced black-blood image, both of which are the coronal planes; the right image shows the effect after direct superposition of the first bright-blood image after the pre-registration and the enhanced black-blood image. The right image shows that although the bright-blood image and the enhanced black-blood image under the current imaging layer can be observed under the same coronal plane after the pre-registration, they still do not coincide, so subsequent accurate registration of the image is required.

Through the pre-registration of the S21, the magnetic resonance images at the same scanning level can be compared in the same coordinate system. However, due to the different scanning times of the bright-blood sequence and the black-blood sequence, and the patient may have slight movement before and after scanning, the above operation is only a rough coordinate transformation, only pre-registration cannot realize the complete registration of multimodal magnetic resonance images, but this step can omit unnecessary processing for the subsequent accurate registration link and improve the processing speed.

S22, extracting content of an area same as a scanning range of the first bright-blood image from the enhanced black-blood image to thereby form the first black-blood image.

Due to the different scanning ranges of vascular imaging in different magnetic resonance sequences, when the bright-blood image is performed to image coordinates transformation, the information of its coronal plane is not as rich as that of the enhanced black-blood image. Therefore, in order to register the same region under the two sequences more quickly and accurately, according to the scanning area of the first bright-blood image, the same scanning area is extracted from the enhanced black-blood image to reduce the registration range of subsequent images. Optionally, the S22 can include the following steps:

1. obtaining vascular edge contour information in the first bright-blood image;

Specifically, Sobel edge detection method can be used to obtain the edge contour information. The edge contour information includes the coordinate values of each edge point.

2. extracting minimum and maximum of abscissa and minimum and maximum of ordinate in the edge contour information to obtain four coordinate values, and determining an initial extraction box based on the four coordinate values;

That is, in the edge contour information, extracting the minimum of the abscissa, the maximum of the abscissa, the minimum of the ordinate and the maximum of the ordinate, and using these four coordinate values to determine the four vertexes of the square box, so as to obtain the initial extraction box;

3. expanding the initial extraction box by a preset number of pixels in each of four directions within a size range of the first bright-blood image, to obtain a final extraction box (also referred as the scanning range of the first bright-blood image);

The four directions are positive direction of the abscissa, negative direction of the abscissa, positive direction of ordinate and negative direction of ordinate; The preset number is reasonably selected according to the type of the vascular image to ensure that the expanded final extraction box does not exceed the size range of the first bright-blood image. For example, the preset number can be 20.

4. extracting content of an area corresponding to the final extraction box in the enhanced black-blood image, to form the first black-blood image.

According to the coordinate range delimited by the final extraction box, the content of the corresponding area in the enhanced black-blood image is extracted, and the extracted content is formed into the first black-blood image. This step extracts the area to be registered to obtain the common scanning range of magnetic resonance images in two modes, which is conducive to the subsequent rapid registration.

Figure 5:
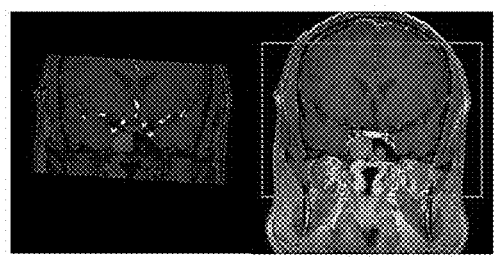
FIG. 5 shows an area to be registered of intracranial vascular magnetic resonance images according to the embodiment of the disclosure.

Referring to FIG. 5, FIG. 5 shows an area to be registered of the intracranial vascular magnetic resonance images according to the embodiment of the disclosure, in which the left image is the first bright-blood image after the pre-registration, the right image is the enhanced black-blood image, and the rectangular box is the area to be extracted in the enhanced black-blood image. This area includes the common scanning range of the bright-blood sequence and the black-blood sequence in the intracranial vascular magnetic resonance images. By determining the area to be extracted, it can pay more attention to useful information more quickly.

The above two-step preprocessing process of the embodiment of the disclosure plays a very important role, the preprocessed image can pay more attention to useful information and exclude irrelevant information. In practical use, using the image preprocessing can improve the reliability of image registration and recognition of the intracranial blood vessels.

S3, performing an image registration to the first bright-blood image of the each of the K number of image pairs by taking the corresponding first black-blood image as a reference through a registration method of mutual information and image pyramid based on Gaussian distribution sampling, to obtain a registered bright-blood image group comprising K number of registered bright-blood images;

In an optional embodiment, the S3 may include step 31 (also referred as S31) to step 34 (also referred as S34):

S31, selecting ones of the K number of preprocessed image pairs as test image pairs by Gaussian distribution sampling;

The test image pairs of the embodiment of the disclosure are the image pairs to be registered, and the random selection of the image pairs to be registered in the embodiment of the disclosure adopts the Gaussian distribution sampling. This is because the scanning directions of the bright-blood image and the enhanced black-blood image are different, in the preprocessing process of image, in order to observe the bright-blood image and the enhanced black-blood image on the same imaging level, coordinate transformation and interpolation is performed to the bright-blood image, so that each bright-blood image corresponds to the enhanced black-blood image on the current level; at the same time, due to the scanning range of the bright-blood image is different from that of the enhanced black-blood image, the data of edge layer of the bright-blood image may not be complete. To sum up, the bright-blood data and enhanced black-blood data in the middle scanning layer are the most abundant. Therefore, the Gaussian mean $\mu$ is selected as a half of the total number of the images to be registered, so that the probability of Gaussian randomly selecting to the middle layer image for registration is the greatest.

S32, performing the image registration to the first bright-blood image and the first black-blood image of each of the test image pairs through the image registration method of mutual information and image pyramid to obtain a rotation matrix corresponding to the first bright-blood image of each of the test image pairs after the image registration, thereby obtaining rotation matrices of the first bright-blood images of the test image pairs after the image registration; in an optional embodiment, the S32 can include step 321 (also referred as S321) to step 324 (also referred as S324):

S321, for each of the test image pairs, based on down-sampling processing, obtaining a bright-blood Gaussian pyramid according to the first bright-blood image and a black-blood Gaussian pyramid according to the first black-blood image; wherein each of the bright-blood Gaussian pyramid and the black-blood Gaussian pyramid includes m number of images with resolutions decreased gradually from bottom to top, and m is a natural number greater than 3;

In order to improve the accuracy of the image registration and avoid the image converging to the local maximum in the registration process, the multi-resolution strategy can be used to solve the problem of local extreme value. At the same time, the multi-resolution strategy can improve the execution speed and robustness of the algorithm under the condition of meeting the image registration accuracy. The construction of the image pyramid is an effective way to improve the registration accuracy and speed by increasing the model complexity, that is, in the registration process, it is carried out in the order from coarse registration to accurate registration. Firstly, the low-resolution images are registered, and then the high-resolution images are registered on the basis of the completion of the low-resolution image registration.

In an optional embodiment, the S321 can include:
obtaining an input image of i-th layer, filtering the input image of the i-th layer with Gaussian kernel, deleting even rows and even columns of the filtered image to obtain an image $G_i$ of the i-th layer of the Gaussian pyramid, and taking the image $G_i$ of the i-th layer as an input image of (i+1)-th layer to obtain an image $G_{i+1}$ of the (i+1)-th layer of the Gaussian pyramid, where i=1, 2, . . . , m−1; when the Gaussian pyramid is the bright-blood Gaussian pyramid, the input image of the first layer is the first bright-blood image; when the Gaussian pyramid is the black-blood Gaussian pyramid, the input image of the first layer is the first black-blood image.

Specifically, multiple images in the Gaussian pyramid are images corresponding to the same original image with different resolutions. Gaussian pyramid obtains the image through Gaussian filtering and down-sampling, construction steps of each layer of the Gaussian pyramid can be divided into two steps: firstly, using Gaussian filtering to smooth the image, that is, Gaussian kernel is used to filter; then, the even rows and the even columns of the filtered image are deleted, that is, the width and height of the image of the lower layer are reduced by half to obtain the image of the current layer. Therefore, the image of the current layer is one fourth of the size of the image of the lower layer. Through continuous iteration of the above steps, the Gaussian pyramid can be obtained.

Gaussian filter is actually a low-pass filter. The image frequency range in Gaussian pyramid is very wide, and the cut-off frequency of the lower layer image is twice that of the higher layer image. Gaussian filtering first uses Gaussian function to calculate a weight matrix, and then uses the weight matrix to convolute the original image. Generally, two-dimensional (2D) Gaussian template can be used for the above processing. Although the effect of blurring the image can be achieved by using the 2D Gaussian template, when a point is at the boundary and there are not enough points around, the edge of the image will be lost due to the relationship of the weight matrix. Therefore, the embodiment of the disclosure optimizes the 2D Gaussian template. The 2D Gaussian filter can be divided into two independent one-dimensional Gaussian filters to filter the image in the horizontal and vertical directions respectively. The separation of Gaussian functions can not only eliminate the edge generated by the 2D Gaussian template, but also greatly speed up the running speed of the program. Compared with other fuzzy filters, Gaussian filter can not only achieve the fuzzy effect of the image, but also better retain the marginal effect.

In this step, through the above processing of the first bright-blood image and the first black-blood image after the preprocessing, the bright-blood Gaussian pyramid and the black-blood Gaussian pyramid can be obtained. As shown in FIG. 6A and FIG. 6B, FIG. 6A and FIG. 6B are schematic diagrams of the bright-blood Gaussian pyramid and the black-blood Gaussian pyramid of the magnetic resonance images of the intracranial blood vessel respectively according to the embodiment of the disclosure.

These resolutions gradually decrease, which come from the combination of images with different resolutions of the same image, which are arranged like a pyramid, so they are called the image pyramid, in which the image with the highest resolution is located at the bottom of the pyramid and the image with the lowest resolution is located at the top of the pyramid. In a computer vision, images with different resolutions exactly simulate an image observed by human eyes at different distances. In image information processing, multi-resolution images are easier to obtain the essential characteristics of image than traditional single resolution images.

S322, based on up-sampling processing, obtaining a bright-blood Laplacian pyramid according to the bright-blood Gaussian pyramid and a black-blood Laplacian pyramid according to the black-blood Gaussian pyramid; wherein each of the bright-blood Laplacian pyramid and the black-blood Laplacian pyramid includes (m−1) number of images with resolutions decreased gradually from bottom to top;

Because of the Gaussian pyramid is down-sampling, that is, narrowing the image, part of the data of the image will be lost. Therefore, in the embodiment of the disclosure, in order to avoid the data loss of the image in the scaling process and recover the detail data, the Laplacian pyramid is used to realize image reconstruction together with the Gaussian pyramid, so as to highlight the details on the basis of the Gaussian pyramid image.

In an optional embodiment, the S322 can include:
performing the up-sampling to the image $G_{i+1}$ of the (i+1)-th layer of the Gaussian pyramid, and filling new-added rows and columns with data 0 to obtain a filled image;
performing convolution to the filled image by using the Gaussian kernel to obtain an approximate value of the filled pixels and obtaining an enlarged image;
performing subtraction operation between the image $G_{1+1}$ of the (i+1)-th layer of the Gaussian pyramid and the enlarged image to obtain an image $L_i$ of the i-th layer of the Laplacian pyramid; Among them, when the Gaussian pyramid is the bright-blood Gaussian pyramid, the Laplacian pyramid is the bright-blood Laplacian pyramid; and when the Gaussian pyramid is the black-blood Gaussian pyramid, the Laplacian pyramid is the black-blood Laplacian pyramid.

Because of the Laplacian pyramid is the residual error between the original image and the original image after the down-sampling, compared along the direction from bottom to top, the Laplacian pyramid has one layer less high-layer image than the Gaussian pyramid structure.

Specifically, the mathematical formula for generating the Laplacian pyramid structure is shown in (1), which $L_i$ represents the i-th layer of the Laplacian pyramid (such as the bright-blood Laplacian pyramid or the black-blood Laplacian pyramid), $G_i$ represents the i-th layer of the Gaussian pyramid (such as the bright-blood Gaussian pyramid or the black-blood Gaussian pyramid), and UP represents up-sampling for image enlarging, and $\otimes$ is a convolution operator, $\zeta_{5\times5}$ is the Gaussian kernel used in building the Gaussian pyramid. This formula shows that the Laplace pyramid is essentially composed of subtracting the data of the residual error of the image of first reduced and then enlarged from the original image. The Laplace pyramid is a residual error prediction pyramid. The core idea of the Laplace pyramid is to store the difference between the original image and the original image after the down-sampling operation and retain the high-frequency information of the image, the purpose is to completely restore the image before the down-sampling at each layer. Because of a part of the information lost in the previous down-sampling operation cannot be completely recovered by the up-sampling, that is, the down-sampling is irreversible, the display effect of the image after down-sampling and then up-sampling is blurred than the original image. By storing the residual error between the original image and the original image after the down-sampling operation, the details can be added to the images of different frequency layers and highlighted on the basis of Gaussian pyramid image.

$$L_i = G_i - \text{UP}(G_{i+1}) \otimes \zeta_{5\times5} \quad (1)$$

Corresponding to the 4 layers Gaussian pyramid, this step can obtain the bright-blood Laplacian pyramid and the black-blood Laplacian pyramid with 3 layers of image. As shown in FIG. 6C and FIG. 6D, FIG. 6C and FIG. 6D are schematic diagrams of the bright-blood Laplacian pyramid and the black-blood Laplacian pyramid of magnetic resonance images of intracranial blood vessel respectively according to the embodiment of the disclosure. The image display uses gamma correction to achieve clearer effect, and the gamma value is 0.5.

S323, registering the image in each layer of the bright-blood Laplacian pyramid with the image in a corresponding layer of the black-blood Laplacian pyramid to obtain a registered bright-blood Laplacian pyramid; in an optional embodiment, the S323 can include:

for each layer of the bright-blood Laplacian pyramid and the black-blood Laplacian pyramid, using the black-blood Laplacian image corresponding to this layer as the reference image, using the bright-blood Laplacian image corresponding to this layer as the floating image, using the similarity measure based on mutual information and adopting the predetermined search strategy to realize the image registration, and thereby obtaining the registered bright-blood Laplace image of this layer;

obtaining the registered bright-blood Laplacian pyramid composed of multi-layer registered bright-blood Laplacian images arranged along the direction from bottom to top according to the order of decreasing resolution; Among them, the black-blood Laplacian image is one of the images of the black-blood Laplacian pyramid, and the bright-blood Laplacian image is one of the images of the bright-blood Laplacian pyramid.

The registration process in this step is similar to the previous pre-registration process. By performing the coordinate transformation and the image interpolation to the bright-blood Laplacian image, using the similarity measurement and the predetermined search strategy to realize the image registration, and the registered bright-blood Laplacian image can be obtained. Among them, the coordinate transformation, the image interpolation, the similarity measurement and the predetermined search strategy will not be repeated.

The results are shown in FIG. 7A through FIG. 7C. FIG. 7A through FIG. 7C show registration results of the Laplacian pyramid images of intracranial vascular magnetic resonance images according to the embodiment of the disclosure. FIG. 7A is the reference image in the black-blood Laplacian pyramid, FIG. 7B is the registered image in the bright-blood Laplacian pyramid, and FIG. 7C is the effect picture after the images of FIG. 7A and FIG. 7C are directly superimposed. The superimposed image is displayed by the montage effect, using the pseudo color transparent processing to the enhance black-blood image and the bright-blood image, in which purple is the enhanced black-blood Laplacian pyramid image and green is the bright-blood Laplacian pyramid image (FIG. 7A through FIG. 7C are the gray processed images of the original images, and the color is not shown).

S324, registering the images in respective layers of the bright-blood Gaussian pyramid with the images in corresponding layers of the black-blood Gaussian pyramid respectively from top to bottom by using the registered bright-blood Laplacian pyramid as superposition information to obtain a registered bright-blood Gaussian pyramid, and obtain the rotation matrix corresponding to the first bright-blood image of the test image pair after the image registration.

In the registration of this step, images with different resolutions in the Gaussian pyramid need to be registered. Since the registration of low-resolution images can more easily grasp the essential characteristics of the image, the embodiment of the disclosure registers high-resolution images on the basis of low-resolution image registration, that is, the Gaussian pyramid image is registered along the direction from top to bottom, the registration result of the image of the upper layer (also referred as the previous layer) is used as the input of the image registration of the lower layer (also referred as the current layer).

In an optional embodiment, the registering images in respective layers of the bright-blood Gaussian pyramid with the images in corresponding layers of the black-blood Gaussian pyramid respectively from top to bottom by using the registered bright-blood Laplacian pyramid as superposition information to obtain a registered bright-blood Gaussian pyramid of the S324, can include:

for an j-th layer from top to down of each of the bright-blood Gaussian pyramid and the black-blood Gaussian pyramid, using a black-blood Gaussian image corresponding to the j-th layer of the black-blood Gaussian pyramid as a reference image and a bright-blood Gaussian image corresponding to the j-th layer of the bright-blood Gaussian pyramid as a floating image, using a similarity measure based on mutual information and adopting a predetermined search strategy to realize the registering of images, thereby obtaining a registered bright-blood Gaussian image of the j-th layer;

performing an up-sampling operation to the registered bright-blood Gaussian image of the j-th layer, adding the registered bright-blood Gaussian image of the j-th layer after the up-sampling operation with a registered bright-blood Laplacian image of a corresponding layer of the registered bright-blood Laplacian pyramid to obtain an added image, and replacing a bright-blood Gaussian image of a (j+1)th layer of the bright-blood Gaussian pyramid by the added image; and taking a black-blood Gaussian image of the (j+1)th layer of the black-blood Gaussian pyramid as a reference image and the bright-blood Gaussian image of the (j+1)th layer after the replacing as a floating image, using a predetermined similarity measure and a predetermined search strategy to realize the registering and thereby obtain a registered bright-blood Gaussian image of the (j+1)th layer; and j=1, 2, . . . , m−1; each the black-blood Gaussian image is one of the m number of images of the black-blood Gaussian pyramid, and each the bright-blood Gaussian image is one of the m number of images of the bright-blood Gaussian pyramid.

repeating the above steps until the high-resolution registration of the Gaussian pyramid image of bottom layer is completed to obtain the registered bright-blood Gaussian pyramid. The registration process is similar to the above pre-registration process. Among them, the coordinate transformation, the image interpolation, the similarity measurement and the predetermined search strategy will not be repeated.

Figure 8:
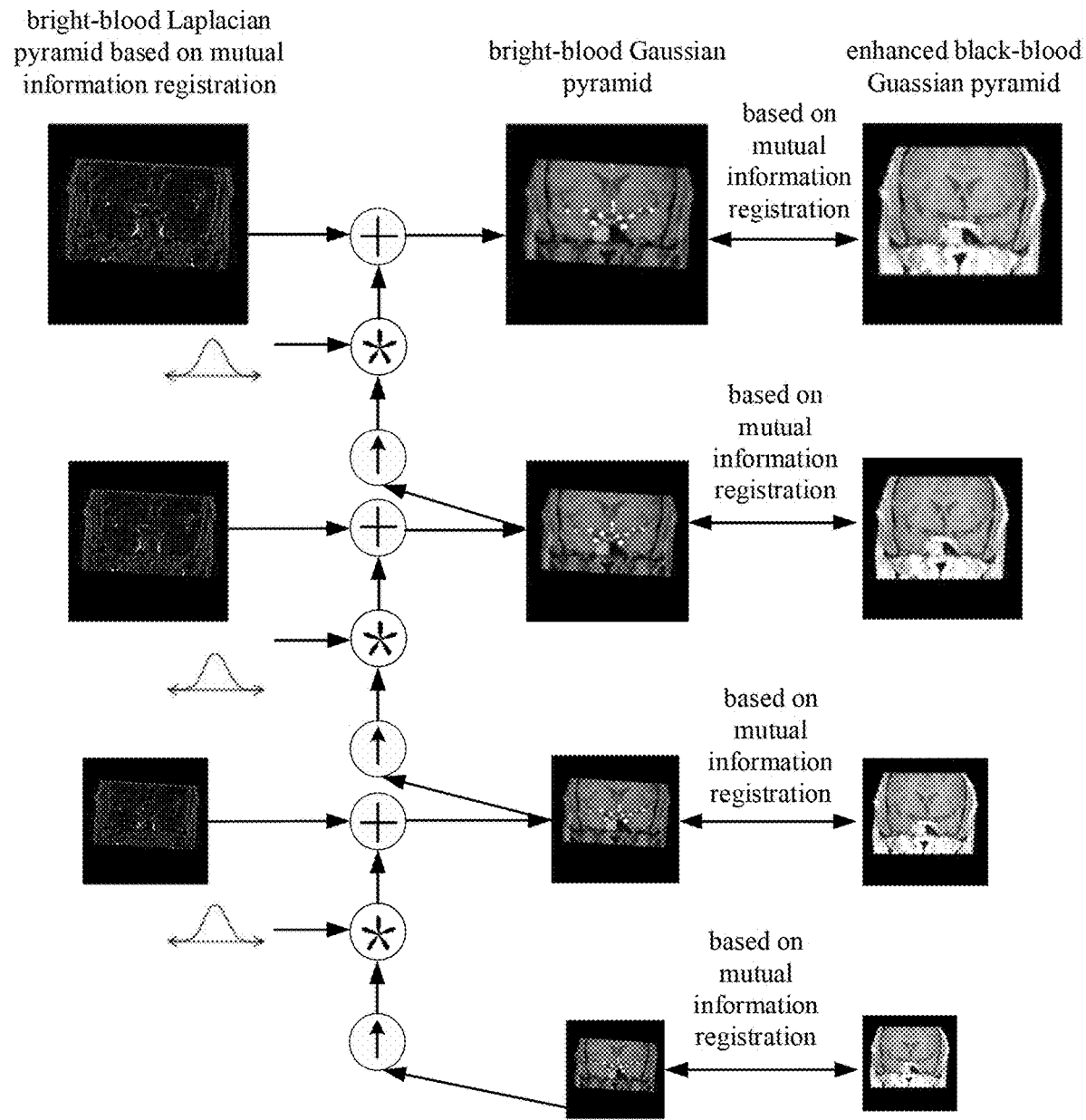
FIG. 8 is a schematic diagram of steps of registration based on mutual information of Gaussian pyramid images of intracranial vascular magnetic resonance images according to the embodiment of the disclosure.

The specific steps of registration of the Gaussian pyramid image based on mutual information are shown in FIG. 8. FIG. 8 is a schematic diagram of steps of registration based on mutual information of Gaussian pyramid images of intracranial vascular magnetic resonance images according to the embodiment of the disclosure. Firstly, performing the registration based on mutual information to the low-resolution black-blood Gaussian image on the top layer and the low-resolution bright-blood Gaussian image on the top layer; then, performing the up-sampling operation to the registered bright-blood Gaussian image and adding it to the registered bright-blood Laplacian image of the corresponding layer that retains the high-frequency information as the bright-blood Gaussian image of the next layer; then, the bright-blood Gaussian image obtained by the above operation is used as the input image, and then it is registered with the black-blood Gaussian image of the corresponding layer, repeating the above operations until the high-resolution registration of the Gaussian pyramid image of the bottom layer is completed.

Figure 9:
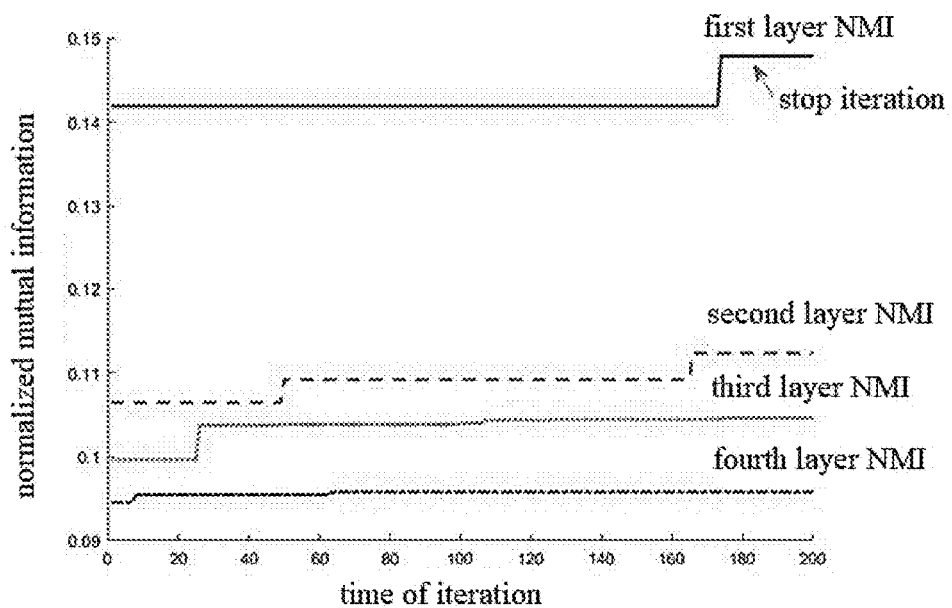
FIG. 9 is a schematic diagram of normalized mutual information under different iteration times according to the embodiment of the disclosure.

In the registration of the Gaussian pyramid image based on the mutual information, it is necessary to register each layer of the bright-blood Gaussian image and the black-blood Gaussian image with the normalized mutual information as the similarity measure, and calculate the NMI of the two images through cyclic iteration until the NMI reaches the maximum. When the times of the iterations is too small, the accurate image registration cannot be completed, but when the times of the iterations is too large, the amount of calculation will increase sharply. FIG. 9 shows the normalized mutual information under different iterations of the embodiment of the disclosure. When the first layer image, that is, the image with the highest-resolution of the bottom layer in the Gaussian pyramid, reaches the maximum NMI value and the data is stable, the iteration is stopped.

So far, the registered bright-blood Gaussian pyramid is obtained, in which the coordinate system of the bright-blood image is consistent with that of the enhanced black-blood image, and the images have high similarity, so the registration process of the vascular image of the embodiment of the disclosure can be completed. After registration, the rotation matrix corresponding to the first bright-blood image in the test image pair can be obtained.

In order to verify effectiveness and practicability of the registration method based on mutual information and image pyramid (hereinafter referred to as mutual information pyramid method) in the embodiment of the disclosure, comparative experiments were also carried out. A total of intracranial vascular magnetic resonance images of five patients were used, in which the enhanced black-blood images and bright-blood images of patients A, B, C and D are 160 respectively, and the enhanced black-blood images and the bright-blood images of patient E are 150 respectively. At the same time, the algorithm that only uses the orientation label information of DICOM image for registration and the registration algorithm based on the mutual information measurement are selected to compare with the mutual information pyramid method in the embodiment of the disclosure. The algorithm based on the mutual information measurement is to find the best transformation between the reference image and the floating image through the multi parameter optimization method, so as to maximize the mutual information value of the two images, and image pyramid algorithm is not used in the algorithm based on the mutual information measurement.

Figure 10A:
FIG. 10A through FIG. 10E show registration results of intracranial vascular magnetic resonance images of multiple of registration methods including mutual information pyramid method.
Figure 10B:
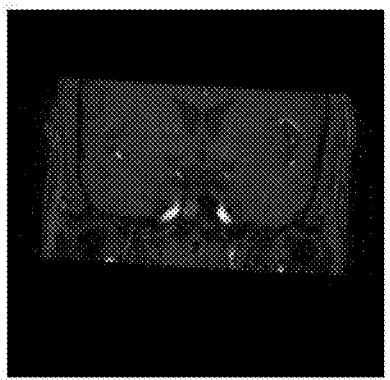
Figure 10C:
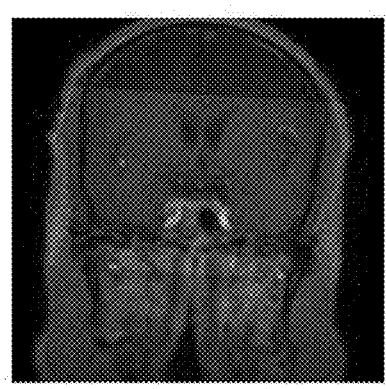
Figure 10D:
Figure 10E:
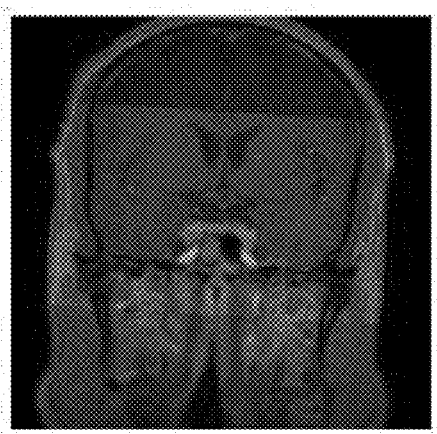

The experimental platform is Matlab R2016b. According to registration results of the experimental images, the combination of qualitative analysis and quantitative analysis is adopted. In terms of the qualitative analysis, due to the large gray difference between multimodal medical images, the difference image obtained by subtracting the registered image from the reference image cannot effectively reflect the registration result of the multimodal medical images. Therefore, the embodiment of the disclosure overlaps the registered image with the reference image, the color overlapping image which can reflect the alignment degree of the registered image and the reference image is obtained. The registration effect of the multimodal registration algorithm is qualitatively analyzed through the color overlapping image, FIG. 10A through FIG. 10E show the registration results of the magnetic resonance images of multimodal intracranial blood vessels, and FIG. 10A through FIG. 10E show the registration results of intracranial vascular magnetic resonance images of various registration methods including the mutual information pyramid method. FIG. 10A is the reference image; FIG. 10B is the floating image; FIG. 10C is the overlapping image based on image orientation label information; FIG. 10D is the overlapping image based on the mutual information measurement; FIG. 10E is the overlapping image of the mutual information pyramid method according to the embodiment of the disclosure. FIG. 10A through FIG. 10E are gray-scale images of the original images, and the color is not shown. In terms of the quantitative analysis, since the evaluation indexes including the root mean square error (RMSE) and the peak signal-to-noise ratio (PSNR) are not suitable for evaluating images with large gray changes, in order to better evaluate the registration results of the multimodal medical images, the normalized cross-correlation coefficient (NCC) and the normalized mutual information (NMI) are used as the evaluation indexes, the larger values of the normalized cross-correlation coefficient and the normalized mutual information, the higher accuracy of the image registration. Table 2 shows the result analysis of the evaluation indexes of different registration algorithms.

TABLE 2 result analysis of the different registration methods (also referred as algorithms)

| data of patient | registration algorithm | NCC$^a$ | NMI$^a$ |
|---|---|---|---|
| patient A | based on image orientation label information | 0.57 ± 0.08 | 0.14 ± 0.01 |
|  | based on mutual information measurement | 0.56 ± 0.05 | 0.13 ± 0.01 |
|  | mutual information pyramid method | 0.59 ± 0.08 | 0.17 ± 0.01 |
| patient B | based on image orientation label information | 0.68 ± 0.07 | 0.21 ± 0.02 |
|  | based on mutual information measurement | 0.57 ± 0.05 | 0.18 ± 0.01 |
|  | mutual information pyramid method | 0.70 ± 0.06 | 0.22 ± 0.01 |
| patient C | based on image orientation label information | 0.57 ± 0.05 | 0.14 ± 0.01 |
|  | based on mutual information measurement | 0.51 ± 0.07 | 0.13 ± 0.01 |
|  | mutual information pyramid method | 0.64 ± 0.05 | 0.17 ± 0.01 |
| patient D | based on image orientation label information | 0.69 ± 0.04 | 0.18 ± 0.01 |
|  | based on mutual information measurement | 0.49 ± 0.04 | 0.15 ± 0.01 |
|  | mutual information pyramid method | 0.71 ± 0.04 | 0.19 ± 0.01 |
| patient E | based on image orientation label information | 0.63 ± 0.08 | 0.16 ± 0.01 |
|  | based on mutual information measurement | 0.53 ± 0.07 | 0.15 ± 0.01 |
|  | mutual information pyramid method | 0.66 ± 0.08 | 0.17 ± 0.01 |

Where the value of $^a$ in the Table 2 is the mean value±mean square error of the evaluation indexes of multiple image registration based on the patient.

The qualitative analysis: it is obvious from the overlapping images from FIG. 10C through FIG. 10E that the method based on mutual information measurement has a large registration offset. The analysis reason may be that it is easy to fall into the local optimal value rather than the global optimal value only using the method based on mutual information measurement; The registration effect based on image orientation label information is also poor, and some images do not overlap; The registration image effect of the mutual information pyramid method is good, the image display is clearer, and the images are almost completely overlapped.

The quantitative analysis: it can be seen from Table 2 that from the two evaluation indexes of NCC and NMI, the mutual information pyramid method of the embodiment of the disclosure improves the registration accuracy compared with the registration algorithm using only the orientation label information of DICOM image and the registration algorithm based on the mutual information measurement, it shows that the registration method based on mutual information and image pyramid proposed in the embodiment of the disclosure can well process the registration of magnetic resonance images of multimodal intracranial blood vessel.

S33, obtaining a mean value of rotation matrix according to the rotation matrices;

In the previous step, the rotation matrix corresponding to the first bright-blood image after registration can be obtained for each test image pair. Then, the mean value of rotation matrix of all test image pairs can be calculated.

S34, performing a coordinate transformation to the first bright-blood images of the other preprocessed image pairs except the test image pairs by using the mean value of rotation matrix to complete the image registration, thereby obtaining the registered bright-blood image group comprising the K number of registered bright-blood images.

Considering that when the patient uses the magnetic resonance bright-blood sequence scanning, if there is a slight movement, the coordinate position of the intracranial vascular image obtained by the bright-blood sequence scanning will change slightly. At this time, it is necessary to carry out the spatial coordinate transformation operation for each bright-blood image in order to maintain the same coordinate position as the enhanced black-blood image. In the registration process of the registration method based on mutual information and image pyramid, the mutual information of each two images to be registered needs to be calculated iteratively. When the size and number of images are large, the consumed time will be too large. If the registration method based on mutual information and image pyramid is used for all image pairs to be registered, the calculation speed will be slow. The applicant considers that the intracranial blood vessel can be regarded as the rigid body, which is different from the heart or lungs and other organs, which will change with the movement of human breathing, so the spatial coordinate transformation operation of each bright-blood image is almost the same, that is, almost the same rotation matrix is used. Refer to Table 3. Table 3 shows the mean value and mean square error of the rotation matrix calculated by the mutual information pyramid method, which is derived from the rotation matrix obtained after the registration based on the mutual information pyramid method of 160 enhanced black-blood images with a size of 400*400 and 160 bright-blood images with a size of 400*400 of patient A. It can be seen from the data that the mean square error of the rotation matrix is very small. Then, the rotation matrix calculated from the registration of a few bright-blood images of the patient can be used to perform the same spatial coordinate transformation for all bright-blood images without calculating the rotation matrix for each bright-blood image, so as to accelerate the image registration process.

TABLE 3 mean value and mean square error of the rotation matrix

| | mean value | mean square error |
|---|---|---|
| rotation matrix | $\begin{bmatrix} 1.0000 & 0.0007 & 0 \\ -00007 & 1.0000 & 0 \\ -2.8901 & 7.7460 & 1.0000 \end{bmatrix}$ | $\begin{bmatrix} -4.0009 & -1.6442 & 0 \\ 1.6442 & -4.0009 & 0 \\ 0.0003 & 0.0005 & 0 \end{bmatrix}$ |

In this step, the mean value of the rotation matrices, that is, a new rotation matrix, is used to transform the coordinates of the first bright-blood image in the other preprocessed image pairs, which can quickly complete the registration of all images and greatly improve the registration speed. The process of using rotation matrix to realize the coordinate transformation, the image interpolation, the similarity measurement based on mutual information and the predetermined search strategy to realize image registration can be seen in the previous text, or can be understood in combination with relevant existing technologies, and will not be repeated here.

After this step, several registered bright-blood images can be obtained. These bright-blood images and the corresponding enhanced black-blood images are in the same coordinate system and have high similarity.

Figure 11A:
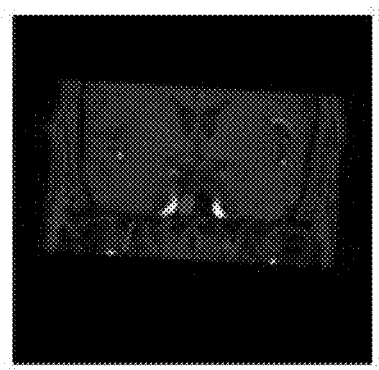
FIG. 11A through FIG. 11I show registration results of intracranial vascular magnetic resonance images of the mutual information pyramid method and the registration method of mutual information and image pyramid based on Gaussian distribution sampling of according to the embodiment of the disclosure.
Figure 11B:
Figure 11C:
Figure 11D:
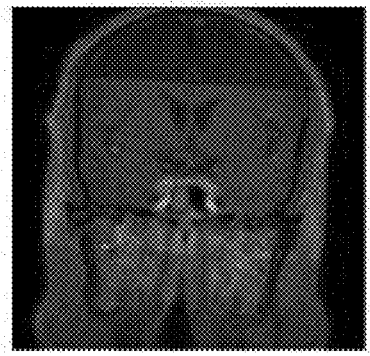
Figure 11E:
Figure 11F:
Figure 11G:
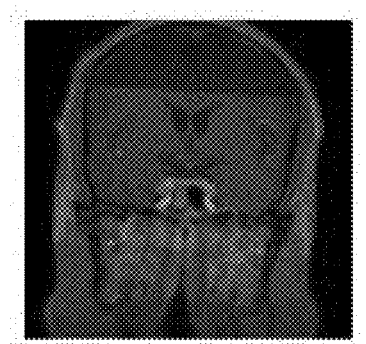
Figure 11H:
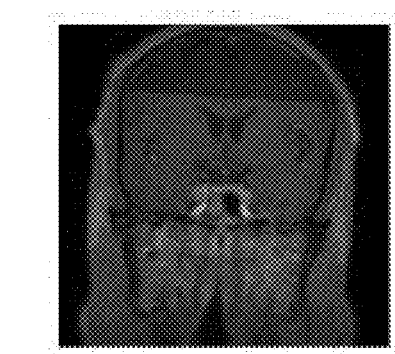
Figure 11I:
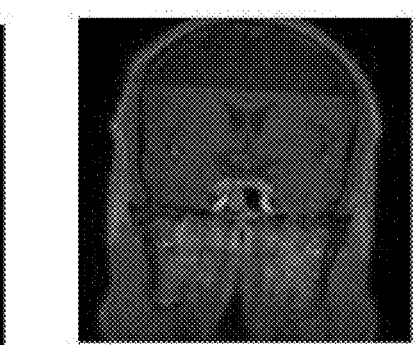

In order to verify the feasibility of the registration method of mutual information and image pyramid based on Gaussian distribution sampling in the embodiment of the disclosure, the intracranial vascular magnetic resonance images of five patients are used for registration, in which the enhanced black-blood images and bright-blood images of patients A, B, C and D are 160 respectively, and the enhanced black-blood images and the bright-blood images of patient E are 150 respectively. For registration results of the experimental images, due to the different acquisition principles and presentation information of multimodal magnetic resonance images, there is still no unified gold standard to evaluate which registration algorithm is the best at this stage. The registration results should be evaluated from the specific registration object and application purpose, so the combination of qualitative analysis and quantitative analysis is adopted. In terms of the qualitative analysis, the registration algorithm results are qualitatively analyzed through the color overlapping images that can reflect the alignment degree of the registered image and the reference image. FIG. 11A through FIG. 11I shows the comparison of the registration results of the magnetic resonance images of multimodal intracranial blood vessel. FIG. 11A through FIG. 11I show the registration results of the intracranial vascular magnetic resonance images of the mutual information pyramid method and the registration method of mutual information and image pyramid based on Gaussian distribution sampling of according to the embodiment of the disclosure. Where FIG. 11A is the reference image; FIG. 11B is the floating image; FIG. 11C is the overlapping image of the mutual information pyramid method; FIG. 11D is the overlapping image of the method of the disclosure, and the standard deviation σ is taken as 1; FIG. 11E is the overlapping image of the method of the disclosure, and the standard deviation σ is taken as 2; FIG. 11F is the overlapping image of the method of the disclosure, and the standard deviation σ is taken as 3; FIG. 11G is the overlapping image of the method of the disclosure, and the standard deviation σ is taken as 4; FIG. 11H is the overlapping image of the method of the disclosure, and the standard deviation σ is taken as 5; FIG. 11I is the overlapping image of the method of the disclosure, and the standard deviation σ is taken as 6. Each image is a processed gray image, and the color is not shown. In terms of the quantitative analysis, the normalized cross-correlation coefficient (NCC) and the normalized mutual information (NMI) are used as evaluation indexes. The larger value of NCC and NMI, the higher accuracy of the image registration. Table 4 shows the registration results of using the registration method based on mutual information and image pyramid (hereinafter referred as mutual information pyramid method) and the registration method of mutual information and image pyramid based on Gaussian distribution sampling proposed in the embodiment of the disclosure (hereinafter referred to as the method of the disclosure) for all image pairs of one patient (other patient data are not displayed due to space limitations), The experimental platform is Matlab R2016b. Because of the method of the disclosure does not need to register all images, it only needs to randomly select a few images for registration. Therefore, when the mean value μ of Gaussian distribution is half of the total number of images to be registered and the standard deviation σ is 1, 2, 3, 4, 5 and 6 respectively, 20 enhanced black-blood images are randomly selected for registration with the corresponding bright-blood images.

TABLE 4 result analysis of different registration algorithms

| patient A | mean value μ | standard deviation σ | Time/s | NCC[a] | NMI[a] |
|---|---|---|---|---|---|
| mutual information pyramid method | | | 153.88 | 0.593 ± 0.085 | 0.167 ± 0.011 |
| the method of the disclosure | 80 | 1 | 26.35 | 0.590 ± 0.088 | 0.164 ± 0.009 |
| | | 2 | 24.43 | 0.591 ± 0.088 | 0.164 ± 0.009 |
| | | 3 | 34.4 | 0.590 ± 0.088 | 0.164 ± 0.009 |
| | | 4 | 36.1 | 0.590 ± 0.088 | 0.164 ± 0.009 |
| | | 5 | 36.5 | 0.590 ± 0.088 | 0.163 ± 0.009 |
| | | 6 | 33.9 | 0.590 ± 0.088 | 0.163 ± 0.009 |

Where the value of [a] in the Table 4 is the mean value±mean square error of the evaluation index based on registration of 160 bright-blood images and 160 enhanced black-blood images.

It can be clearly seen from the overlapping image of FIG. 11C through FIG. 11I that the registration image of the mutual information pyramid method and the registration image of the method of the disclosure perform well, and the images are almost completely overlapped together; As can be seen from table 4, from the two evaluation indexes of NCC and NMI, although the accuracy of the method of the disclosure is lower than that of the mutual information pyramid method, there is no much difference wider different Gaussian distribution function settings. When the size and number of images involved in registration are large, the calculation amount of the mutual information pyramid method is large. The method of the disclosure improves the algorithm according to the rigid spatial transformation characteristics of intracranial blood vessels, and accelerates the image registration by using the similarity of the transformation matrix. The experimental results show that the registration time of the improved algorithm is only one fifth of that of the mutual information pyramid method, which can greatly improve the registration speed and well realize the registration of magnetic resonance images of multimodal intracranial blood vessels.

In the registration scheme provided by the embodiment of the disclosure, the intracranial blood vessel can be regarded as the rigid body, and the spatial coordinate transformation operation of each bright-blood image is almost the same, so the same rotation matrix can be used. Therefore, on the one hand, selecting a small number of the image pairs for image registration of the bright-blood images, and using the mean value of rotation matrix of the registered small number of bright-blood images to perform the same spatial coordinate transformation for the bright-blood images of other image pairs without calculating the rotation matrix for each other bright-blood image, so the image registration process can be accelerated. On the other hand, in the process of image registration, mutual information is used as the similarity measure, and the image pyramid algorithm is used to increase the model complexity, which can improve the registration accuracy and speed. Compared with the prior art, the observation of bright-blood images and black-blood images of intracranial vessels requires doctors' spatial imagination and subjective experience. The embodiment of the disclosure adopts the image registration method, which can unify the bright-blood image and the enhanced black-blood image in the same coordinate system, it can facilitate doctors to understand the intracranial vascular images corresponding to black-blood sequence and bright-blood sequence, simply and quickly obtain the comprehensive information required for diagnosis, and provide accurate and reliable reference information for subsequent medical diagnosis, operation plan and radiotherapy plan. At the same time, the image registration is an important step in the subsequent elimination of flowing void artifacts. The registration scheme provided by the embodiment of the disclosure can provide a better reference mode for other medical image registration, and has great clinical application value. At the same time, the image registration process of the embodiment of the disclosure is an important basis for the subsequent elimination of flowing void artifact.

After the image registration, the flowing void artifact in the registered enhanced black-blood image can be eliminated. The reason for the flowing void artifact is that in the process of vascular wall imaging, due to the blood vessels is too thin, the flow velocity at the detour of blood is slow, and the surrounding blood and tissue fluid can have signal pollution problem, In the images obtained by black-blood sequence scanning, the blood information that should be black appears as bright color instead, so as to simulate the wall thickening or plaque appearance of normal individuals and exaggerate the degree of vascular stenosis. The embodiment of the disclosure considers using the blood information in the registered bright-blood image to correct the blood information with incorrect signal display in the registered enhanced black-blood image, and embedding the blood information in the registered bright-blood image into the registered enhanced black-blood image, so as to achieve the effect of image fusion. It can be achieved through the following steps:

S4, performing an elimination operation of flowing void artifact to the K number of enhanced black-blood images of the enhanced black-blood image group by using the registered bright-blood image group, to obtain an artifact-elimination enhanced black-blood image group comprising K number of target enhanced black-blood images;

In an optional embodiment, the S4 can include step 41 (also referred as S41)~step 44 (also referred as S44):

S41, improving contrast of each of the K number of registered bright-blood images to obtain a contrast-enhanced bright-blood image, thereby obtaining K number of contrast-enhanced bright-blood images;

In an optional embodiment, according to the characteristics that the blood in the bright-blood image is high signal and the surrounding brain tissue is low signal, the gray-scale linear transformation can be carried out on the registered bright-blood image, and the gray range of the image can be adjusted to improve the image contrast.

Figure 12:
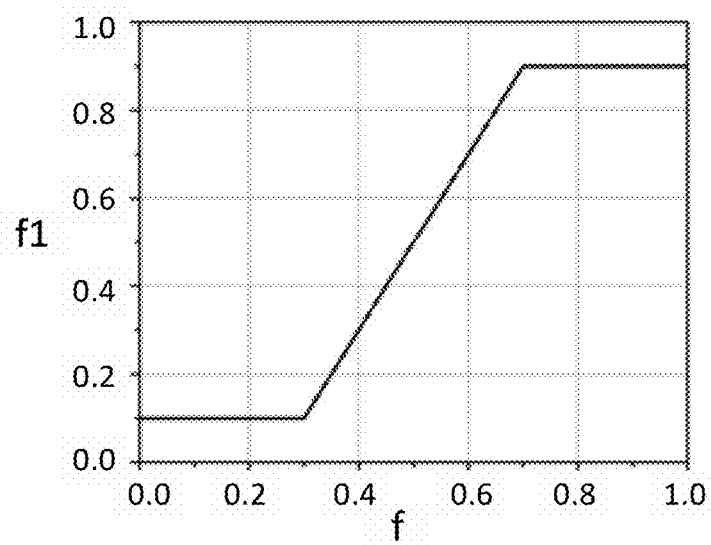
FIG. 12 is a schematic diagram of gray-scale linear transformation and parameter setting according to the embodiment of the disclosure.
Figure 13:
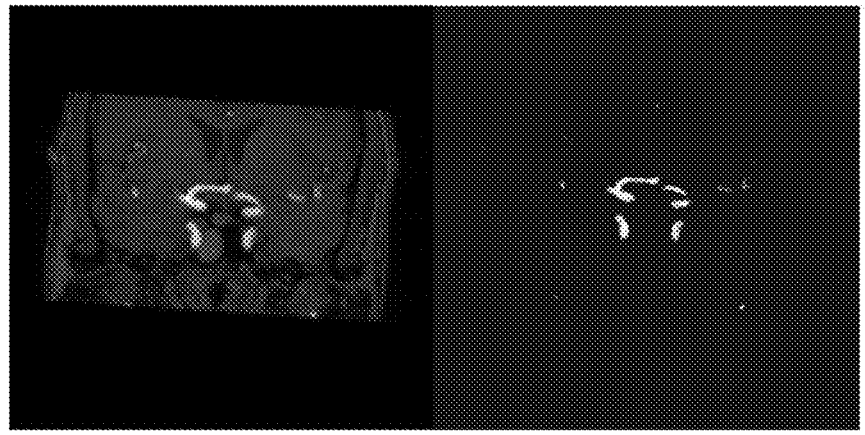
FIG. 13 shows a result of gray-scale linear transformation according to the embodiment of the disclosure.

For example, a specific gray-scale linear transformation and parameter setting used for the registered bright-blood image are shown in FIG. 12 which is a schematic diagram of gray-scale linear transformation and parameter setting provided by the embodiment of the disclosure. Using the gray-scale linear transformation shown in FIG. 12, the smaller gray value change range in the original registered bright-blood image f can be extended to the larger gray value change range in the new registered bright-blood image f1 (such as contrast-enhanced bright-blood image), and the image gray range can be adjusted to improve the contrast of the registered bright-blood image. Through this step, the contrast-enhanced bright-blood image can be obtained. Referring to FIG. 13, FIG. 13 shows a result of gray-scale linear transformation according to the embodiment of the disclosure, that is, the result image of the registered bright-blood image after the gray-scale linear transformation. Among them, the left image is the registered bright-blood image, and the right image is the result image after the gray-scale linear transformation. It can be seen that the contrast of the blood part in the right image is significantly enhanced compared with the surrounding pixels. Because of the pixel range of medical image is large, which may be in a range from −1000 to +1000, through this step, the pixel range can be normalized to a range from 0 to 255 to become a pixel range in line with general image processing, which can facilitate subsequent processing. For the specific process of the gray-scale linear transformation, please refer to the relevant prior art and will not be repeated here.

S42, extracting the blood information from each of the K number of contrast-enhanced bright-blood images by using the first threshold;

In an optional embodiment, the S42 can includes step 421 (also referred as S421)~step 423 (also referred as S423):

S421, determining a first threshold by using a preset image binarization method;

S422, extracting the blood information from each of the K number of contrast-enhanced bright-blood images by using the first threshold;

The method used in S422 is called threshold segmentation.

S423, obtaining the bright-blood feature image according to the extracted blood information.

The preset image binarization method is the binarization processing of the image. The gray level of the points on the image can be set to 0 or 255, that is, the whole image presents an obvious black-and-white effect. That is, the gray images with 256 brightness levels can obtain a binary image that still reflect the overall and local characteristics of the image through appropriate threshold selection. Through the preset image binarization method, the embodiment of the disclosure can highlight the blood information in the contrast-enhanced bright-blood image as white and display the irrelevant information as black, so as to extract the bright-blood feature image corresponding to the blood information. The preset image binarization method in the embodiment of the disclosure can include the maximum interclass variance method OTSU, kittle, etc.

The extraction formula of the blood information is shown in (2), where T(x,y) represents the gray value of the contrast-enhanced bright-blood image, F(x,y) represents the gray value of the bright-blood feature image, and T represents the first threshold.

$$F(x, y) = \begin{cases} 1 & T(x, y) \geq T \\ 0 & T(x, y) < T \end{cases} \quad (2)$$

Figure 14:
FIG. 14 shows a result of image binarization according to the embodiment of the disclosure.

In an optional embodiment, the method of maximum interclass variance method OTSU is adopted, and a result are shown in FIG. 14. FIG. 14 shows a result of the image binarization of the embodiment of the disclosure, in which the left image is the contrast-enhanced bright-blood image, and the right image is the blood information after threshold extraction. It can be seen that the bright part in the right image is only information related to the blood.

step 43, fusing each of the K number of bright-blood feature images with the enhanced black-blood image corresponding to the registered bright-blood image according to a preset image fusion formula to obtain the target enhanced black-blood image of elimination of flowing void artifact corresponding to the enhanced black-blood image;

In this step, firstly, the spatial mapping relationship between the bright-blood feature image and the corresponding enhanced black-blood image is established, the bright-blood feature image is mapped to the corresponding enhanced black-blood image, and the image fusion is carried out according to the preset fusion formula, the preset fusion formula is:

$$g(x, y) = \begin{cases} 0 & F(x, y) > 0 \\ R(x, y) & F(x, y) = 0 \end{cases}. \quad (3)$$

Where, F(x,y) represents the gray value of the bright-blood feature image, R(x,y) represents the gray value of the corresponding enhanced black-blood image, and g(x,y) represents the gray value of the target enhanced black-blood image after the fusion.

Through the above operations, the gray value of the flowing void artifact in the corresponding enhanced black-blood image, which should be black but appears as bright color, can be changed to black, so as to achieve the purpose of eliminating the flowing void artifact.

Figure 15:
FIG. 15 shows results of eliminating flowing void artifact obtained by different methods for the intracranial blood vessel according to the embodiment of the disclosure.

Referring to FIG. 15, FIG. 15 shows the results of eliminating the flowing void artifact obtained by different methods for the intracranial blood vessel in the embodiment of the disclosure, in which the flowing void artifact appears at the arrow, the first image on the left is the original image of the enhanced black-blood image of the intracranial blood vessel with the flowing void artifact, and the second image on the left is the result obtained by the flowing void artifact elimination method using the registration method based on mutual information and image pyramid, the third image on the left shows the result obtained by the flowing void artifact elimination method using the registration method of mutual information and image pyramid based on Gaussian distribution sampling, where the standard deviation σ of Gaussian distribution is 3, it can be seen that the elimination effects of the flowing void artifact elimination method of the registration method of mutual information and image pyramid based on Gaussian distribution sampling adopted in the embodiment of the disclosure and the flowing void artifact elimination method of the registration method based on mutual information and image pyramid are better. However, it can be understood that the flowing void artifact elimination method of the registration method of mutual information and image pyramid based on Gaussian distribution sampling adopted in the embodiment of the disclosure has faster processing speed than the flowing void artifact elimination method based on mutual information and pyramid, and the experiment shows that about 80% of the time can be saved.

S44, obtaining the artifact-elimination enhanced black-blood image group according to the target enhanced black-blood images respectively corresponding to the K number of enhanced black-blood images.

After all the enhanced black-blood images have completed the elimination of flowing void artifact, the artifact-elimination enhanced black-blood image group can be obtained.

In the scheme provided by the embodiment of the disclosure, the bright-blood image and the enhanced black-blood image scanned by the magnetic resonance angiography technology are registered by the registration method of mutual information and image pyramid based on Gaussian distribution sampling, which can improve the registration accuracy and speed. The blood information is extracted from the registered bright-blood image through threshold segmentation and fused into the registered enhanced black-blood image, so as to correct the blood information with incorrect signal display in the registered enhanced black-blood image, and change the gray value of the flowing void artifact in bright color to black, so as to eliminate the flowing void artifact and obtain more accurate display comprehensive intracranial vascular images. The scheme provided by the embodiment of the disclosure is to eliminate the flowing void artifact from the perspective of image post-processing without using new imaging technology, imaging mode or pulse sequence. Therefore, the flowing void artifact can be eliminated simply, accurately and quickly, and can be well popularized in the clinical application.

S5, performing a subtraction operation between each of the K number of target enhanced black-blood images of the artifact-elimination enhanced black-blood image group and a corresponding one of the K number of black-blood images of the black-blood image group, to obtain K number of angiography enhanced images;

Each target enhanced black-blood image is subtracted from the corresponding black-blood image to obtain the angiography enhanced image with angiography enhancement effect. When all target enhanced black-blood images are subtracted from the corresponding black-blood images, the K angiography enhanced images can be obtained. It can be understood that these K angiography enhanced images are two-dimensional images.

S6, establishing a blood 3D model by using the registered bright-blood image group;

It can be understood that the registered bright-blood images are two-dimensional images. Through the three-dimensional reconstruction of the registered bright-blood images, the blood information can be expressed as a three-dimensional structure and the blood three-dimensional model can be established. Among them, the process of obtaining a three-dimensional model with three-dimensional effect from two-dimensional image through interpolation is called three-dimensional reconstruction. Current 3D reconstruction technologies include a method of marching cubes (MC), a method of maximum intensity projection (MIP), a method of surface shadow masking (SSD), a volume roaming technology (VRT), a method of curved planar reconstruction (CPR), a virtual endoscopy (VE) technology, etc. The embodiment of the disclosure can adopt any three-dimensional reconstruction method to establish the blood three-dimensional model. The blood three-dimensional model can preliminarily simulate the three-dimensional blood vessels and intuitively display the direction of blood vessels and lesion area.

In an optional embodiment, the S6 can include step 61 (also referred as S61)~step 63 (also referred as S63):

S61, acquiring a first 3D volume data composed of the K number of contrast-enhanced bright-blood images;

The K number of contrast-enhanced bright-blood images obtained in the S41 can be obtained. Those skilled in the art can understand that K number of contrast-enhanced bright-blood images are actually stacked into a three-dimensional cube data. In order to facilitate differentiation, it is named as the first three-dimensional volume data in the embodiment of the disclosure.

S62, calculating a second threshold corresponding to a second 3D volume data located at a middle of the first 3D volume data by using a maximum interclass variance method;

In this step, the OTSU is still used to determine the threshold, but it is different from the first threshold determined by this method in S421, in this step, the OTSU is used to calculate a threshold corresponding to multiple contrast-enhanced bright-blood images in a small cube (also called the second three-dimensional volume data) near the middle part in the large three-dimensional cube of the first three-dimensional volume data as the second threshold.

Because in the angiography enhanced image, the blood information is basically concentrated in the middle of the image, for the first three-dimensional volume data, selecting the middle small cube data (that is second three-dimensional volume data) to determine the second threshold can reduce the amount of threshold calculation and improve the calculation speed, and the second threshold is accurately applicable to all blood information in the first three-dimensional volume data.

For the size of the second three-dimensional volume data, you can first determine the center point of the first three-dimensional volume data, and then extend in six directions corresponding to the cube with the preset edge length, so as to determine the size of the second three-dimensional volume data. The preset edge length can be determined according to the empirical value including Willis ring, such as ¼ of the edge length of the cube of the first three-dimensional volume data. Willis ring is the most important collateral circulation pathway in the brain, connecting the bilateral hemispheres with the anterior and posterior circulation.

S63, using the second threshold as an input threshold of a method of marching cubes, and processing the first 3D volume data by the method of marching cubes to obtain the blood 3D model.

As previously described, the method of marching cubes (it is abbreviated to MC) is a three-dimensional reconstruction method, which can process the first three-dimensional volume data according to the given input threshold to directly obtain the blood three-dimensional model.

Compared with other surface rendering algorithms, the method of marching cubes has the advantages of good mesh quality. For the specific processing process of the first three-dimensional volume data by the method of marching cubes, please refer to the relevant prior art and will not be repeated here.

Figure 16A:
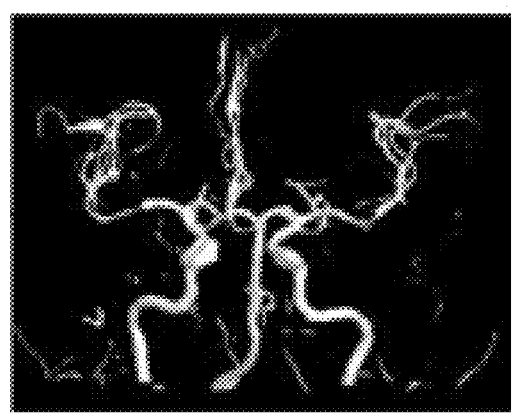
FIG. 16A through FIG. 16C respectively show effects of a blood 3D model, a vascular 3D model and an angiography enhanced 3D model according to the embodiment of the disclosure.

See FIG. 16A for the specific result. FIG. 16A shows effect of the blood three-dimensional model for intracranial blood vessels in the embodiment of the disclosure.

S7, establishing a vascular 3D model with blood boundary expansion by using the registered bright-blood image group;

The blood three-dimensional model obtained in the S6 represents the flow direction and regional distribution of intracranial blood. In fact, there is the vascular wall around the blood, so the blood three-dimensional model cannot fully represent the real intracranial blood vessels.

Therefore, in the S7, the blood boundary in the registered bright-blood image can be expanded so that the expanded blood boundary can cover the range of intracranial vascular wall to form the effect of a hollow tube, and then the three-dimensional model can be generated by the three-dimensional reconstruction method for the two-dimensional image after expanding the blood boundary, and then the vascular three-dimensional model closer to the real intracranial blood vessel is obtained than the blood three-dimensional model in the S5.

The expansion of blood boundary can be realized by detecting pixels of the blood boundary in the registered bright-blood image, and expanding the detected pixels by a preset number of pixels in the preset direction. The preset number of pixels can be selected according to the empirical values obtained from a large number of intracranial vessel diameter and vessel wall thickness data. Of course, the method of expanding the blood boundary in the embodiment of the disclosure is not limited to this.

In an optional embodiment, S7 can include step 71 (also referred as S71)~step 75 (also referred as S75):

S71, acquiring the K number of bright-blood feature images;

That is obtaining the K number of bright-blood feature images in the S42.

S72, expanding a blood boundary of each of the K number of bright-blood feature images according to an expansion operation, to obtain K number of expanded bright-blood feature images corresponding to the K number of bright-blood feature images;

Expansion operation is a kind of morphological operation. Expansion operation can fill the image void and expand the convex points of the object at the edge outward. Finally, the area of the expanded object is larger than that of the original object. The expansion operation can be recorded as A⊕B, defined as A⊕B={x: B(x)∩A≠Φ}, where B represents the structural element and A represents the original image. The original image A here is the bright-blood feature image. There are only two-pixel values of 0 and 255 in the bright-blood feature image. 0 corresponds to black and 255 corresponds to white.

The structural element is also called kernel, which can be regarded as a convolution kernel. The expansion operation is to use this convolution kernel B to convolute the original image A to find the local maximum. The convolution kernel B usually has an anchor point, which is usually located in the center of the convolution kernel. With the convolution kernel scanning the original image A, calculating the maximum pixel value of the superposition area to and replace the position of the anchor point with the maximum pixel value. That is, the maximization operation causes the bright area in the image to grow (so it is called expansion). In short, the convolution kernel is used to translate from left to right and from top to bottom on the original image. If there is white in the box corresponding to the convolution kernel, all the colors in the box will become white.

The box corresponding to the convolution kernel can be rectangular, elliptical or circular. Specifically, you can obtain the required kernel by passing the shape and size of the box corresponding to the convolution kernel in cv2.getStructuringElement( ) of the OpenCV function.

In an optional embodiment, a circular box of the kernel with a radius of 1 can be used to expand the bright-blood feature image in multiple steps until the maximum gradient position is reached, so as to determine the outer wall boundary of the blood vessel, realize the segmentation of the blood vessel wall, and obtain the expanded bright-blood feature image corresponding to the bright-blood feature image. Because of the vascular wall is close to the blood and the tube wall is very thin, assuming that the expanded range is the range of the vascular wall, this step can include the region of the vascular wall near the blood as the search range of the angiography enhancement characteristics of the vascular wall. For the specific implementation process of expansion operation, please refer to the relevant prior art and will not be repeated here.

S73, calculating a difference between each of the K number of expanded bright-blood feature images and the corresponding bright-blood feature image, to obtain K number of difference feature images corresponding to the K number of bright-blood feature images respectively;

In this step, the difference feature image obtained for each bright-blood feature image is a two-dimensional plan view similar to a hollow blood vessel. Similarly, the pixel values of the difference feature image are only 0 and 255.

S74, determining a third threshold;

In this step, a pixel value can be selected as the third threshold for all difference feature images according to the empirical value. For example, any value between 100 and 200, such as 128, can be selected as the third threshold.

S75, taking the third threshold as an input threshold of the method of marching cubes, and processing the K number of difference feature images by the method of marching cubes, to obtain the vascular 3D model with blood boundary expansion.

The method of marching cubes uses the third threshold as the input threshold, and the vascular three-dimensional model with blood boundary expansion can be obtained from the K difference feature images. The specific implementation process of the method of marching cubes will not be repeated here.

Figure 16B:
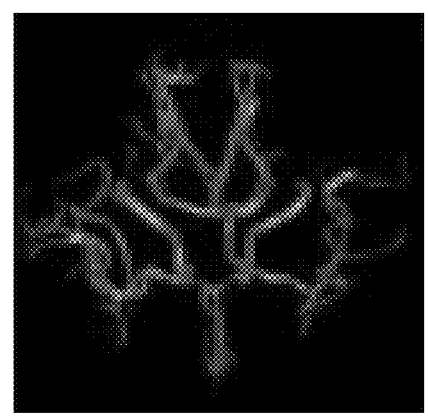

See FIG. 16B for the specific result. FIG. 16B shows the effect of the vascular three-dimensional model for intracranial blood vessels in the embodiment of the disclosure. Among them, the image is gray processed, and in practice, it can be displayed in blue and other colors.

S8, establishing an angiography enhanced 3D model by using the K number of angiography enhanced images;

This step can be realized by the method of marching cubes. For details, see the S6 and the S7, which will not be repeated here.

Figure 16C:
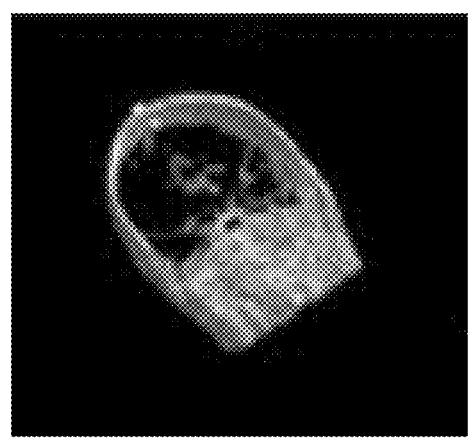

See FIG. 16C for the specific result. FIG. 16C shows the effect of the angiography enhanced 3D model for intracranial blood vessels in the embodiment of the disclosure. The image is processed by gray level, and can be displayed in red and other colors in practice.

S9, obtaining an enhanced 3D model of intracranial angiography based on the blood 3D model, the vascular 3D model and the angiography enhanced 3D model.

In an optional embodiment, S9 can include step 91 (also referred as S91) and step 92 (also referred as S92):

S91, retaining an area of the angiography enhanced 3D model overlapped with the vascular 3D model, to obtain a retained angiography enhanced 3D model;

Since the angiography enhanced 3D model obtained in the S8 does not only include the angiography enhancement of the blood vessels, and enhancement characteristics of unrelated tissues need to be excluded, the search range of the angiography enhancement characteristics of the vascular wall in the vascular three-dimensional model obtained in the S7 is used to judge whether the angiography enhanced three-dimensional model obtained in the S8 is located in the vascular wall area near the blood, that is, judge whether there is an overlap with the vascular three-dimensional model in the angiography enhanced three-dimensional model. If so, it indicates that the overlap is within the search range, and the overlap needs to be retained. Therefore, the retained angiography enhanced three-dimensional model is obtained.

S92, fusing the retained angiography enhanced 3D model with the blood 3D model, to obtain the enhanced 3D model of intracranial angiography.

By fusing the retained angiography enhanced 3d model representing angiography enhancement with the blood 3D model representing blood information, we can visually display the vascular wall with obvious angiography enhancement, and clearly see which part of intracranial blood vessels has the most obvious angiography enhancement effect, then atherosclerotic or vulnerable plaque may appear in this area.

In an optional embodiment, the angiography enhanced quantitative analysis can be obtained in the enhanced three-dimensional model of intracranial angiography. Specifically, the plaque enhancement index CE can be obtained for any point on the vascular wall in the enhanced three-dimensional model of intracranial angiography, which is defined as:

$$CE = \frac{S_{postBBMR} - S_{preBBMR}}{S_{preBBMR}}. \quad (4)$$

Where $S_{preBBMR}$ and $S_{postBBMR}$ are respectively signal intensities of the black-blood image and the angiography enhanced black-blood image.

It can be understood by those skilled in the art that $S_{preBBMR}$ and $S_{postBBMR}$ are the information carried in the images after photographing the black-blood image and the angiography enhanced black-blood image respectively. The embodiment of the disclosure uses the above information to obtain the plaque enhancement index CE of each point along the edge of the intracranial vascular wall and embody it in the enhanced three-dimensional model of intracranial angiography, which can facilitate doctors to obtain more detailed vascular information. Specifically, when CE is greater than a plaque threshold, such as 0.5, it indicates that there is a plaque on the vascular wall. Therefore, by measuring the plaque enhancement index of the area of the vascular wall, it is helpful to identify the responsible intracranial artery plaque, and can provide valuable diagnostic auxiliary information. The fusion technology of two three-dimensional models can be realized by using the existing technology, which will not be repeated here. Refer to FIG. 17 for specific results. FIG. 17 shows effect of the enhanced three-dimensional model of intracranial angiography in the embodiment of the disclosure. The image is processed by gray scale. In practice, different colors can be used to distinguish in FIG. 17. For example, blue is the vascular site without angiography enhancement, and red is the vascular site with angiography enhancement. The bright part in the white coil in the attached drawings of the specification is the vascular site with angiography enhancement, that is, here may be intracranial atherosclerosis or vulnerable plaque, and the rest is the vascular site without angiography enhancement, and the enhanced three-dimensional model of intracranial angiography can realize the basic functions of rotation, magnification and reduction, so as to help doctors locate the focus area and make more accurate judgment.

In schemes provided by the embodiments of the disclosure, firstly, performing the image registration to the bright-blood images and the enhanced black-blood images scanned by the magnetic resonance angiography technology by using the registration method of mutual information and image pyramid based on Gaussian distribution sampling, which can improve the registration efficiency and improve the registration accuracy layer by layer from low-resolution to high-resolution, and the bright-blood images and the enhanced black-blood images can be unified in the same coordinate system through the above image registration. Secondly, performing the elimination operation of flowing void artifact to the enhanced black-blood image by using the registered bright-blood image, which can display more accurate and comprehensive vascular information. The schemes provided by the embodiments of the disclosure is to eliminate the flowing void artifact from the perspective of image post-processing without using new imaging technology, imaging mode or pulse sequence, therefore, the flowing void artifact can be eliminated simply, accurately and quickly, and can be well popularized in the clinical application. Thirdly, establishing the blood 3D model and the vascular 3D model with blood boundary expansion by using the registered bright-blood images, and calculating the difference between each of the artifact-elimination enhanced black-blood images and the corresponding black-blood image to obtain the angiography enhanced 3D with angiography enhancement effect, and finally, obtaining the enhanced 3D model of intracranial angiography corresponding to the vascular wall with the angiography enhancement effect based on the blood 3D model, the vascular 3D model and the angiography enhanced 3D model. The enhanced 3D model of intracranial angiography realizes the 3D visualization of the intracranial blood vessels. It does not need doctors to restore the tissue structure and disease characteristics of the intracranial blood vessels through imagination. It is convenient for doctors to observe and analyze the morphological characteristics of the blood vessels from any interested angle and level, and can provide realistic 3D spatial information of the blood vessels, convenient to visually display the vascular wall with obvious angiography enhancement, and convenient to locate and display the lesion area. In the clinical application, it can easily and quickly obtain the real information of intracranial blood vessels for analyzing vascular disease.

Note: the patient experimental data in the embodiment of the disclosure are from Shaanxi Provincial People's Hospital in China, and the image can be used for general scientific research. The above are only preferred embodiments of the disclosure and are not used to limit the protection scope of the disclosure. Any modification, equivalent replacement, improvement, etc. made within the spirit and principles of the disclosure are included in the protection scope of the disclosure.

What is claimed is:

1. A method of establishing an enhanced three-dimensional (3D) model of intracranial angiography, comprising:
obtaining a bright-blood image group, a black-blood image group and an enhanced black-blood image group of an intracranial vascular site; wherein the bright-blood image group, the black-blood image group and the enhanced black-blood image group respectively comprise K number of bright-blood images, K number of black-blood images and K number of enhanced black-blood images, the K number of bright-blood images of the bright-blood image group, the K number of black-blood images of the black-blood image group and the K number of enhanced black-blood images of the enhanced black-blood image group are corresponded one by one, and K is a natural number greater than 2;
taking each of the K number of bright-blood images and one of the K number of enhanced black-blood images corresponding thereto as an image pair to obtain K number of image pairs, and preprocessing each of the K number of image pairs to obtain a first bright-blood image and a first black-blood image of the each of the K number of image pairs, thereby obtaining K number of preprocessed image pairs;
performing an image registration to the first bright-blood image of the each of the K number of image pairs by taking the corresponding first black-blood image as a reference through a registration method of mutual information and image pyramid based on Gaussian distribution sampling, to obtain a registered bright-blood image group comprising K number of registered bright-blood images;
performing an elimination operation of flowing void artifact to the K number of enhanced black-blood images of the enhanced black-blood image group by using the registered bright-blood image group, to obtain an artifact-elimination enhanced black-blood image group comprising K number of target enhanced black-blood images;
performing a subtraction operation between each of the K number of target enhanced black-blood images of the artifact-elimination enhanced black-blood image group and a corresponding one of the K number of black-blood images of the black-blood image group, to obtain K number of angiography enhanced images;
establishing a blood 3D model by using the registered bright-blood image group;
establishing a vascular 3D model with blood boundary expansion by using the registered bright-blood image group;
establishing an angiography enhanced 3D model by using the K number of angiography enhanced images; and
obtaining an enhanced 3D model of intracranial angiography based on the blood 3D model, the vascular 3D model and the angiography enhanced 3D model.

2. The method according to claim 1, wherein the preprocessing each of the K number of image pairs to obtain a first bright-blood image and a first black-blood image of the each of the K number of image pairs, comprises:
for the image pair, taking the enhanced black-blood image as a reference, performing a coordinate transformation and an image interpolation to the bright-blood image, using a similarity measure based on mutual information and adopting a predetermined search strategy to thereby obtain the first bright-blood image; and
extracting content of an area same as a scanning range of the first bright-blood image from the enhanced black-blood image to thereby form the first black-blood image.

3. The method according to claim 1, wherein the performing an image registration to the first bright-blood image of the each of the K number of image pairs by taking the corresponding first black-blood image as a reference through a registration method based on mutual information and image pyramid of Gaussian distribution sampling, to obtain a registered bright-blood image group comprising K number of registered bright-blood images, comprises:
selecting ones of the K number of preprocessed image pairs as test image pairs by Gaussian distribution sampling;
performing the image registration to the first bright-blood image and the first black-blood image of each of the test image pairs through the image registration method of mutual information and image pyramid to obtain a rotation matrix corresponding to the first bright-blood image of each of the test image pairs after the image registration, thereby obtaining rotation matrices of the first bright-blood images of the test image pairs after the image registration;
obtaining a mean value of rotation matrix according to the rotation matrices; and
performing a coordinate transformation to the first bright-blood images of the other preprocessed image pairs except the test image pairs by using the mean value of rotation matrix to complete the image registration, thereby obtaining the registered bright-blood image group comprising the K number of registered bright-blood images.

4. The method according to claim 3, wherein the performing the image registration to the first bright-blood image and the first black-blood image of each of the test image pairs through the image registration method based on mutual information and image pyramid to obtain a rotation matrix corresponding to the first bright-blood image of each of the test image pairs after the image registration, comprises:
for each of the test image pairs, based on down-sampling processing, obtaining a bright-blood Gaussian pyramid according to the first bright-blood image and a black-blood Gaussian pyramid according to the first black-blood image; wherein each of the bright-blood Gaussian pyramid and the black-blood Gaussian pyramid comprises m number of images with resolutions decreased gradually from bottom to top, and m is a natural number greater than 3;
based on up-sampling processing, obtaining a bright-blood Laplacian pyramid according to the bright-blood Gaussian pyramid and a black-blood Laplacian pyramid according to the black-blood Gaussian pyramid; wherein each of the bright-blood Laplacian pyramid and the black-blood Laplacian pyramid comprises (m−1) number of images with resolutions decreased gradually from bottom to top;
registering the image in each layer of the bright-blood Laplacian pyramid with the image in a corresponding layer of the black-blood Laplacian pyramid to obtain a registered bright-blood Laplacian pyramid; and
registering the images in respective layers of the bright-blood Gaussian pyramid with the images in corresponding layers of the black-blood Gaussian pyramid respectively from top to bottom by using the registered bright-blood Laplacian pyramid as superposition information to obtain a registered bright-blood Gaussian pyramid, and obtain the rotation matrix corresponding to the first bright-blood image of the test image pair after the image registration.

5. The method according to claim 4, wherein the registering images in respective layers of the bright-blood Gaussian pyramid with the images in corresponding layers of the black-blood Gaussian pyramid respectively from top to bottom by using the registered bright-blood Laplacian pyramid as superposition information to obtain a registered bright-blood Gaussian pyramid, comprises:

for an j-th layer from top to down of each of the bright-blood Gaussian pyramid and the black-blood Gaussian pyramid, using a black-blood Gaussian image corresponding to the j-th layer of the black-blood Gaussian pyramid as a reference image and a bright-blood Gaussian image corresponding to the j-th layer of the bright-blood Gaussian pyramid as a floating image, using a similarity measure based on mutual information and adopting a predetermined search strategy to realize the registering of images, thereby obtaining a registered bright-blood Gaussian image of the j-th layer;

performing an up-sampling operation to the registered bright-blood Gaussian image of the j-th layer, adding the registered bright-blood Gaussian image of the j-th layer after the up-sampling operation with a registered bright-blood Laplacian image of a corresponding layer of the registered bright-blood Laplacian pyramid to obtain an added image, and replacing a bright-blood Gaussian image of a (j+1)th layer of the bright-blood Gaussian pyramid by the added image; and taking a black-blood Gaussian image of the (j+1)th layer of the black-blood Gaussian pyramid as a reference image and the bright-blood Gaussian image of the (j+1)th layer alter the replacing as a floating image, using a predetermined similarity measure and a predetermined search strategy to realize the registering and thereby obtain a registered bright-blood Gaussian image of the (j+1)th layer;

wherein j=1, 2, . . . , m−1; each the black-blood Gaussian image is one of them number of images of the black-blood Gaussian pyramid; and each the bright-blood Gaussian image is one of the m number of images of the bright-blood Gaussian pyramid.

6. The method according to claim 1, wherein the performing an elimination operation of flowing void artifact to the K number of enhanced black-blood images of the enhanced black-blood image group by using the registered bright-blood image group, to obtain an artifact-elimination enhanced black-blood image group comprising K number of target enhanced black-blood images, comprises:

improving contrast of each of the K number of registered bright-blood images to obtain a contrast-enhanced bright-blood image, thereby obtaining K number of contrast-enhanced bright-blood images;

extracting blood information from each of the K number of contrast-enhanced bright-blood images to obtain K number of bright-blood feature images;

fusing each of the K number of bright-blood feature images with the enhanced black-blood image corresponding to the registered bright-blood image according to a preset image fusion formula to obtain the target enhanced black-blood image of elimination of flowing void artifact corresponding to the enhanced black-blood image; and obtaining the artifact-elimination enhanced black-blood image group according to the target enhanced black-blood images respectively corresponding to the K number of enhanced black-blood images.

7. The method according to claim 6, wherein the extracting blood information from each of the K number of contrast-enhanced bright-blood images to obtain K number of bright-blood feature images, comprises:

determining a first threshold by using a preset image binarization method;

extracting the blood information from each of the K number of contrast-enhanced bright-blood images by using the first threshold; and obtaining the bright-blood feature image according to the extracted blood information.

8. The method according to claim 7, wherein the establishing a blood 3D model by using the registered bright-blood image group, comprises:

acquiring a first 3D volume data composed of the K number of contrast-enhanced bright-blood images;

calculating a second threshold corresponding to a second 3D volume data located at a middle of the first 3D volume data by using a maximum interclass variance method; and using the second threshold as an input threshold of a method of marching cubes, and processing the first 3D volume data by the method of marching cubes to obtain the blood 3D model.

9. The method according to claim 8, wherein the establishing a vascular 3D model with blood boundary expansion by using the registered bright-blood image group, comprises:

acquiring the K number of bright-blood feature images;

expanding a blood boundary of each of the K number of bright-blood feature images according to an expansion operation, to obtain K number of expanded bright-blood feature images corresponding to the K number of bright-blood feature images respectively;

calculating a difference between each of the K number of expanded bright-blood feature images and the corresponding bright-blood feature image, to obtain K number of difference feature images corresponding to the K number of bright-blood feature images respectively;

determining a third threshold; and taking the third threshold as an input threshold of the method of marching cubes, and processing the K number of difference feature images by the method of marching cubes, to obtain the vascular 3D model with blood boundary expansion.

10. The method according to claim 1, wherein the obtaining an enhanced 3D model of intracranial angiography based on the blood 3D model, the vascular 3D model and the angiography enhanced 3D model, comprises:

retaining an area of the angiography enhanced 3D model overlapped with the vascular 3D model, to obtain a retained angiography enhanced 3D model; and fusing the retained angiography enhanced 3D model with the blood 3D model, to obtain the enhanced 3D model of intracranial angiography.

11. The method according to claim 2, wherein the extracting content of an area same as a scanning range of the first bright-blood image from the enhanced black-blood image to thereby form the first black-blood image, comprises:

obtaining vascular edge contour information in the first bright-blood image;

extracting minimum and maximum of abscissa and minimum and maximum of ordinate in the edge contour information to obtain four coordinate values, and determining an initial extraction box based on the four coordinate values;

expanding the initial extraction box by a preset number of pixels in each of four directions within a size range of the first bright-blood image, to obtain a final extraction box; and extracting content of an area corresponding to the final extraction box in the enhanced black-blood image, to form the first black-blood image.

12. The method according to claim 4, wherein the obtaining a bright-blood Laplacian pyramid according to the bright-blood Gaussian pyramid and a black-blood Laplacian pyramid according to the black-blood Gaussian pyramid uses the following mathematical formula:

$L_i = G_i - UP(G_{i+1}) \otimes \zeta_{5\times5}$, where $L_i$ represents an i-th layer of one of the bright-blood Laplacian pyramid and the black-blood Laplacian pyramid, $G_i$ represents an i-th layer of a corresponding one of the bright-blood Gaussian pyramid and the black-blood Gaussian pyramid, UP represents up-sampling for image enlarging, $\otimes$ is a convolution operator, $\zeta_{5\times5}$ is a Gaussian kernel used in building the one of the bright-blood Laplacian pyramid and the black-blood Laplacian pyramid, and i is a positive integer less than or equal to (m−1).

\* \* \* \* \*